US012790433B2

(12) United States Patent
Kwon et al.

(10) Patent No.: US 12,790,433 B2
(45) Date of Patent: Nov. 10, 2026

(54) POLYMER, METHOD OF PREPARING SAME, AND POLYURETHANE PREPARED BY USING SAME

(71) Applicant: Seoul National University R&DB Foundation, Seoul (KR)

(72) Inventors: Min Sang Kwon, Seongnam-si (KR); Changhoon Yu, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 590 days.

(21) Appl. No.: 18/467,316

(22) Filed: Sep. 14, 2023

(65) Prior Publication Data

US 2024/0117103 A1 Apr. 11, 2024

(30) Foreign Application Priority Data

Sep. 15, 2022 (KR) ........................ 10-2022-0116041
Sep. 13, 2023 (KR) ........................ 10-2023-0122101

(51) Int. Cl.

| | |
|---|---|
| ***C08F 20/12*** | (2006.01) |
| ***C08G 18/62*** | (2006.01) |
| ***C08G 61/04*** | (2006.01) |

(52) U.S. Cl.

CPC .............. *C08G 61/04* (2013.01); *C08F 20/12* (2013.01); *C08G 18/622* (2013.01); *C08F 2438/03* (2013.01)

(58) Field of Classification Search

None

See application file for complete search history.

(56) References Cited

U.S. PATENT DOCUMENTS 7,557,235 B2 7/2009 Lai et al.
8,137,754 B2 3/2012 Lai et al.
(Continued)

FOREIGN PATENT DOCUMENTS

CN 102770465 A 11/2012
CN 111808534 A 10/2020
(Continued)

OTHER PUBLICATIONS

Kim, K. et al., "Molecular-Weight Distribution of Living Chains in Polystyrene Prepared by Reversible Addition-Fragmentation Chain-Transfer Polymerization". Macromolecules, 2019, 52, 7448-7455. (Year: 2019).*

(Continued)

*Primary Examiner* — Richard A. Huhn
(74) *Attorney, Agent, or Firm* — CANTOR COLBURN LLP

(57) ABSTRACT

A polymer represented by Chemical Formula 1 having a number average molecular weight of about 10 g/mol to 1,000,000 g/mol, and PDI of about 1 to about 1.1, a process of preparing the polymer, and a polyurethane prepared by using the polymer are provided:

Chemical Formula 1

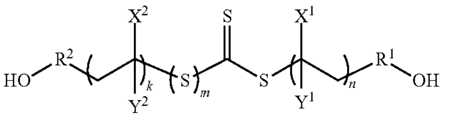

In Chemical Formula 1, each of $R^1$, $R^2$, $X^1$, $X^2$, $Y^1$, $Y^2$, k, m, and n is as defined as in the detailed description of the invention.

14 Claims, 10 Drawing Sheets

(56) References Cited

U.S. PATENT DOCUMENTS

| | | | | |
|---|---|---|---|---|
| 2005/0099991 | A1 | 5/2005 | Birdwell et al. | |
| 2008/0153982 | A1 | 6/2008 | Masler et al. | |
| 2020/0024373 | A1 | 1/2020 | Hernandez et al. | |
| 2020/0308333 | A1 * | 10/2020 | Arntz | C08G 18/4837 |

FOREIGN PATENT DOCUMENTS

| | | | |
|---|---|---|---|
| KR | 20160009583 | A | 1/2016 |
| KR | 20190077438 | A | 7/2019 |

OTHER PUBLICATIONS

Kinoshita, K. et al., "Design of Dithiobenzoate RAFT Agent Bearing Hydroxyl Groups and Its Application in RAFT Polymerization for Telechelic Diol Polymers". Polymers, 2017, 9(2), 44, 1-10. (Year: 2017).*

European Communication pursuant to Article 94(3) dated Feb. 6, 2024, 10 pages.

European Search Report for European Patent Application No. 23197510.3 dated Jan. 25, 2024, 5 pages.

Kim et al., "Molecular-Weight Distribution of Living Chains in Polystyrene Prepared by Reversible Addition-Fragmentation Chain-Transfer Polymerization". Macromolecules, 2019, 52, 7448-7455, ACS.

Kinoshita et al., "Design of Dithiobenzoate RAFT Agent Bearing Hydroxyl Groups and Its Application in RAFT Polymerization for Telechelic Diol Polymers", 9, 44, 2017, 1-10.

Liu et al., "Synthesis of Polyacrylate-Based Polyurethane by Organocatalyzed Group Transfer Polymerization and Polyaddition", Macromolecular Chemistry and Physics, 2020, 221, 2000217.

Sarbu et al., "Synthesis of Hydroxy-Telechelic Poly(methyl acrylate) and Polystyrene by Atom Transfer Radical Coupling", Macromolecules, 2004, 37, 9694-9700.

Sudo et al., "RAFT-Approach to Well-Defined Telechelic Vinyl Polymers with Hydroxyl Terminals as Polymeric Diol-Type Building Blocks for Polyurethanes", Journal of Polymer Science, 2013, 51, 318-326.

Jun Yuan, Synthesis of amphiphilic PU graft copolymers and their application as stabilizers for emulsion, Xiangtan University, Jun. 2017, 55 pp.

* cited by examiner $PTMEG_{0.95}$-$PBA_{0.05}$-$DMG_1$-$IPU_2$ $PTMEG_1$-$DMG_1$-$IPU_2$

PTMEG$_{0.95}$-PBA/BZP$_{0.05}$-EG$_2$-IPU3

POLYMER, METHOD OF PREPARING SAME, AND POLYURETHANE PREPARED BY USING SAME

CROSS-REFERENCE TO RELATED APPLICATIONS

This application claims priority to and the benefit of, under 35 U.S.C. § 119, Korean Patent Application Nos. 10-2022-0116041 and 10-2023-0122101, filed in the Korean Intellectual Property Office on Sep. 15, 2022, and Sep. 13, 2023, respectively, the entire contents of which are incorporated herein by reference.

BACKGROUND

1. Field

Example embodiments relate to a polymer, method of preparing the polymer, and a polyurethane prepared by using the polymer.

2. Description of Related Art

Since the properties of a polymer are closely related to its structure, it is very important to synthesize polymers with a perfectly defined structure. As reversible-deactivation radical polymerization (RDRP), such as, for example, atom transfer radical polymerization (ATRP), reversible addition-fragmentation chain transfer (RAFT), etc., can be performed under mild conditions from a wide range of monomers and enable the preparation of well-defined and structurally complex polymeric materials, it is most widely used for the above purposes.

SUMMARY

Some example embodiments provide a polymer having hydroxy groups at both ends, being structurally well defined, and having a very low polydispersity index.

Some example embodiments provide a polyurethane prepared from the above polymer.

Some example embodiments provide a method of preparing the polymer.

The polymer according to some example embodiments is represented by Chemical Formula 1, and has a number average molecular weight of 10 to 1,000,000 gram/mole (g/mol) and a polydispersity Index of about 1 to about 1.1:

Chemical Formula 1

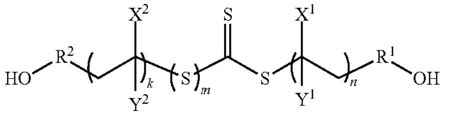

In Chemical Formula 1, $R^1$ and $R^2$ are each independently, a substituted or unsubstituted C1 to C30 alkylene group, a substituted or unsubstituted C3 to C30 cycloalkylene group, a substituted or unsubstituted C2 to C30 heterocycloalkylene group, a substituted or unsubstituted C2 to C30 alkenylene group, a substituted or unsubstituted C6 to C30 arylene group, a substituted or unsubstituted C2 to C30 heteroarylene group, wherein, $—R^aOR^b—$, $—R^aC(=)(NR^c)R^b—$, $—R^a(NR^c)R^b—$, $—R^aPO_2R^b—$, $—R^aPO_3R^b—$, $—R^aPO_4R^b—$, $—R^aSO_2R^b—$, $—R^aSO_3R^b—$, $—R^aSO_4R^b—$, or a combination thereof, wherein, $R^a$ and $R^b$ are, each independently, a substituted or unsubstituted C1 to C20 alkylene group, a substituted or unsubstituted C3 to C20 cycloalkylene group, a substituted or unsubstituted C2 to C20 heterocycloalkylene group, a substituted or unsubstituted C2 to C20 alkenylene group, a substituted or unsubstituted C6 to C20 arylene group, a substituted or unsubstituted C2 to C20 heteroarylene group, or a combination thereof, and $R^c$ is hydrogen, deuterium, a substituted or unsubstituted C1 to C30 alkyl group, a substituted or unsubstituted C3 to C30 cycloalkyl group, a substituted or unsubstituted C2 to C30 heterocycloalkyl group, a substituted or unsubstituted C2 to C30 alkenyl group, a substituted or unsubstituted C2 to C30 cycloalkenyl group, a substituted or unsubstituted C2 to C30 heterocycloalkenyl group, a substituted or unsubstituted C2 to C30 alkynyl group, a substituted or unsubstituted C3 to C30 cyclo alkynyl group, a substituted or unsubstituted C2 to C30 heterocycloalkynyl group, a substituted or unsubstituted C6 to C30 aryl group, a substituted or unsubstituted C2 to C30 heteroaryl group, a substituted or unsubstituted C1 to C30 acyl group, a substituted or unsubstituted C1 to C30 alkoxy group, a substituted or unsubstituted C6 to C30 aryloxy group, a substituted or unsubstituted C1 to C30 alkylthio group, a substituted or unsubstituted C2 to C30 alkenylthio group, a substituted or unsubstituted C2 to C30 alkynylthio group, or a combination thereof, $X^1$ and $X^2$ are, each independently, hydrogen, deuterium, a substituted or unsubstituted C1 to C30 alkyl group, or halogen atom, $Y^1$ and $Y^2$ are, each independently, hydrogen, deuterium, Halogen atom, hydroxyl group, a substituted or unsubstituted C1 to C30 alkoxy group, a substituted or unsubstituted C6 to C30 aryloxy group, cyano group, nitro group, a ubstituted or unsubstituted amino group, a substituted or unsubstituted C1 to C30 alkyl group, a substituted or unsubstituted C3 to C30 cycloalkyl group, a substituted or unsubstituted C1 to C30 heteroalkyl group, a substituted or unsubstituted C2 to C30 heterocyclo alkyl group, a substituted or unsubstituted C2 to C30 alkenyl group, a substituted or unsubstituted C3 to C30 cyclo alkenyl group, a substituted or unsubstituted C2 to C30 heterocyclo alkenyl group, a substituted or unsubstituted C2 to C30 alkynyl group, a substituted or unsubstituted C3 to C30 cyclo alkynyl group, a substituted or unsubstituted C2 to C30 heterocyclo alkynyl group, a substituted or unsubstituted C6 to C30 aryl group, a substituted or unsubstituted Ringed C3 to C30 heteroaryl group, $—R^aOR^d$, $—R^aC(=O)OR^d$, $—R^aC(=O)(NR^c)R^d$, $—R^a(NR^c)R^d$, $—R^aPO_2R^d$, $—R^aPO_3R^d$, $—R^aPO_4R^d$, $—R^aSO_2R^d$, $—R^aSO_3R^d$, $—R^aPO_4R^d$, or a combination thereof, wherein, $R^a$ is, each independently, single bond, a substituted or unsubstituted C1 to C20 alkylene group, a substituted or unsubstituted C3 to C20 cycloalkylene group, a substituted or unsubstituted C2 to C20 heterocycloalkylene group, a substituted or unsubstituted C2 to C20 alkenylene group, a substituted or unsubstituted C3 to C20 cyclo alkylkenylene group, a substituted or unsubstituted C6 to C20 arylene group, a substituted or unsubstituted C2 to C20 heteroarylene group, or a combination thereof, $R^c$ and $R^d$ are, each independently, hydrogen, deuterium, a substituted or unsubstituted C1 to C30 alkyl group, a substituted or unsubstituted C3 to C30 cycloalkyl group, a substituted or unsubstituted C2 to C30 heterocycloalkyl group, a substituted or unsubstituted C2 to C30 alkenyl group, a substituted or unsubstituted C2 to C30 cycloalkenyl group, a substituted or unsubstituted C2 to C30 heterocycloalkenyl group, a substituted or unsubstituted C2 to C30 alkynyl group, a substituted or unsubstituted C3 to C30 cyclo alkynyl group, a substituted or unsubstituted C2 to C30 heterocycloalkynyl group, a substituted or unsubstituted C6 to C30 aryl group, a substituted or unsubstituted C2 to C30 heteroaryl group, a substituted or unsubstituted C1 to C30 acyl group, a substituted or unsubstituted C1 to C30 alkoxy group, a substituted or unsubstituted C6 to C30 aryloxy group, a substituted or unsubstituted C1 to C30 alkylthio group, a substituted or unsubstituted C2 to C30 alkenylthio group, a substituted or unsubstituted C2 to C30 alkynylthio group, or a combination thereof, m is an integer of 0 or 1, and k is an integer of 0 or more, provided that if m is 0, then k is also 0, and n is an integer of greater than or equal to 1, provided that if n is an integer of 2 or more, then $X^1$ and $Y^1$ in two or more structural units denoted by n are the same as or different from each other, and provided that if k is an integer of 2 or more, then $X^2$ and $Y^2$ in two or more structural units denoted by k are the same as or different from each other.

The method of preparing the polymer according to the above embodiment includes stirring a mixture of a compound represented by Chemical Formula 11 and a compound represented by Chemical Formula 12 while irradiating light in visible light region under a nitrogen atmosphere:

Checmial Formula 11

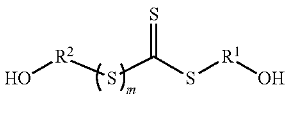

In Chemical Formula 11, $R^1$ and $R^2$ are each independently, a substituted or unsubstituted C1 to C30 alkylene group, a substituted or unsubstituted C3 to C30 cycloalkylene group, a substituted or unsubstituted C2 to C30 heterocycloalkylene group, a substituted or unsubstituted C2 to C30 alkenylene group, a substituted or unsubstituted C6 to C30 arylene group, a substituted or unsubstituted C2 to C30 heteroarylene group, —$R^aOR^b$—, —$R^aC(=O)(NR^c)R^b$—, —$R^a(NR^c)R^b$—, —$R^aPO_2R^b$—, —$R^aPO_3R^b$—, —$R^aPO_4R^b$—, —$R^aSO_2R^b$—, —$R^aSO_3R^b$—, —$R^aPO_4R^b$—, or a combination thereof, wherein, $R^a$ and $R^b$ are, each independently, a substituted or unsubstituted C1 to C20 alkylene group, a substituted or unsubstituted C3 to C20 cycloalkylene group, a substituted or unsubstituted C2 to C20 heterocycloalkylene group, a substituted or unsubstituted C2 to C20 alkenylene group, a substituted or unsubstituted C6 to C20 arylene group, a substituted or unsubstituted C2 to C20 heteroarylene group, or a combination thereof, and $R^c$ is, hydrogen, deuterium, a substituted or unsubstituted C1 to C30 alkyl group, a substituted or unsubstituted C3 to C30 cycloalkyl group, a substituted or unsubstituted C2 to C30 heterocycloalkyl group, a substituted or unsubstituted C2 to C30 alkenyl group, a substituted or unsubstituted C2 to C30 cycloalkenyl group, a substituted or unsubstituted C2 to C30 heterocycloalkenyl group, a substituted or unsubstituted C2 to C30 alkynyl group, a substituted or unsubstituted C3 to C30 cyclo alkynyl group, a substituted or unsubstituted C2 to C30 heterocycloalkynyl group, a substituted or unsubstituted C6 to C30 aryl group, a substituted or unsubstituted C2 to C30 heteroaryl group, a substituted or unsubstituted C1 to C30 Acyl group, a substituted or unsubstituted C1 to C30 alkoxy group, a substituted or unsubstituted C6 to C30 aryloxy group, a substituted or unsubstituted C1 to C30 alkylthio group, a substituted or unsubstituted C2 to C30 alkenylthio group, a substituted or unsubstituted C2 to C30 alkynylthio group, or a combination thereof, m is an integer of 0 or 1;

Chemical Formula 12

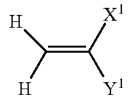

In Chemical Formula 12, $X^1$ is hydrogen, deuterium, a substituted or unsubstituted C1 to C30 alkyl group, or halogen atom, $Y^1$ is hydrogen, deuterium, a halogen atom, hydroxyl group, a substituted or unsubstituted C1 to C30 alkoxy group, a substituted or unsubstituted C6 to C30 aryloxy group, cyano group, nitro group, a substituted or unsubstituted amino group, a substituted or unsubstituted C1 to C30 alkyl group, a substituted or unsubstituted C3 to C30 cycloalkyl group, a substituted or unsubstituted C1 to C30 heteroalkyl group, a substituted or unsubstituted C2 to C30 heterocyclo alkyl group, a substituted or unsubstituted C2 to C30 alkenyl group, a substituted or unsubstituted C3 to C30 cyclo alkenyl group, a substituted or unsubstituted C2 to C30 heterocyclo alkenyl group, a substituted or unsubstituted C2 to C30 alkynyl group, a substituted or unsubstituted C3 to C30 cyclo alkynyl group, a substituted or unsubstituted C2 to C30 heterocyclo alkynyl group, a substituted or unsubstituted C6 to C30 aryl group, a substituted or unsubstituted C3 to C30 heteroaryl group, —$R^aOR^d$, —$R^aC(=O)OR^d$, —$R^a(NR^c)R^d$, —$R^aC(=O)(NR^c)R^d$, —$R^a(NR^c)R^d$, —$R^aPO_2R^d$, —$R^aPO_3R^d$, —$R^aPO_4R^d$, —$R^aSO_2R^d$, —$R^aSO_3R^d$, —$R^aPO_4R^d$, or a combination thereof, wherein, R a is, each independently, single bond, a substituted or unsubstituted C1 to C20 alkylene group, a substituted or unsubstituted C3 to C20 cycloalkylene group, a substituted or unsubstituted C2 to C20 heterocycloalkylene group, a substituted or unsubstituted C2 to C20 alkenylene group, a substituted or unsubstituted C3 to C20 cyclo alkylkenylene group, a substituted or unsubstituted C6 to C20 arylene group, a substituted or unsubstituted C2 to C20 heteroarylene group, or a combination thereof, and $R^c$ and $R^d$ are, each independently, hydrogen, deuterium, a substituted or unsubstituted C1 to C30 alkyl group, a substituted or unsubstituted C3 to C30 cycloalkyl group, a substituted or unsubstituted C2 to C30 heterocycloalkyl group, a substituted or unsubstituted C2 to C30 alkenyl group, a substituted or unsubstituted C2 to C30 cycloalkenyl group, a substituted or unsubstituted C2 to C30 heterocycloalkenyl group, a substituted or unsubstituted C2 to C30 alkynyl group, a substituted or unsubstituted C3 to C30 cyclo alkynyl group, a substituted or unsubstituted C2 to C30 heterocycloalkynyl group, a substituted or unsubstituted C6 to C30 aryl group, a substituted or unsubstituted C2 to C30 heteroaryl group, a substituted or unsubstituted C1 to C30 acyl group, a substituted or unsubstituted C1 to C30 alkoxy group, a substituted or unsubstituted C6 to C30 aryloxy group, a substituted or unsubstituted C1 to C30 alkylthio group, a substituted or unsubstituted C2 to C30 alkenylthio group, a substituted or unsubstituted C2 to C30 alkynylthio group, or a combination of thereof.

A polyurethane according to another embodiment is prepared by reacting the polymer represented by Chemical Formula 1 with a mixture including a polyol represented by Chemical Formula 4 and a diisocyanate compound represented by Chemical Formula 5:

Chemical Formula 4

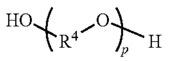

Chemical Formula 5

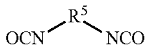

In Chemical Formula 4 and Chemical Formula 5, $R^4$ and $R^5$ are, each independently, a substituted or unsubstituted C1 to C30 alkylene group, a substituted or unsubstituted C1 to C30 heteroalkylene group, a substituted or unsubstituted C3 to C30 cycloalkylene group, a substituted or unsubstituted C2 to C30 heterocycloalkylene group, a substituted or unsubstituted C2 to C30 alkenylene group, a substituted or unsubstituted C2 to C30 heteroalkenylene group, a substituted or unsubstituted C2 to C30 cycloalkenylene group, a substituted or unsubstituted C2 to C30 heterocycloalkenylene group, a substituted or unsubstituted C2 to C30 alkynylene group, a substituted or unsubstituted C6 to C30 arylene group, a substituted or unsubstituted C2 to C30 heteroarylene group, or a combination thereof, and p in Chemical Formula 4 is an integer of 1 or more.

The mixture further includes one or more of the compounds represented by Chemical Formula 6 and Chemical Formula 7:

Chemical Formula 6

$$HO—R^6—OH$$

Chemical Formula 7

$$H_2NR^7—NH_2$$

In Chemical Formula 6 and Chemical Formula 7, $R^6$ and $R^7$ are, each independently, a substituted or unsubstituted C1 to C30 alkylene group, a substituted or unsubstituted C3 to C30 cycloalkylene group, a substituted or unsubstituted C1 to C30 heteroalkylene group, a substituted or unsubstituted C2 to C30 alkenylene group, a substituted or unsubstituted C3 to C30 cycloalkenylene group, a substituted or unsubstituted C2 to C30 heteroalkynylene group, a substituted or unsubstituted C2 to C30 alkynylene group, a substituted or unsubstituted C3 to C30 cycloalkynylene group, a substituted or unsubstituted C2 to C30 heteroalkynylene group, a substituted or unsubstituted C6 to C30 arylene group, a substituted or unsubstituted C2 to C30 heteroarylene group, or a combination thereof.

The polymer represented by Chemical Formula 1 has two terminals substituted with hydroxyl groups and very narrow molecular weight distribution. Accordingly, a polyurethane prepared by using the polymer has also narrow molecular weight distribution and a precisely controlled structure, and thus, can advantageously be applied to various industrially useful applications.

Also, the polymer represented by Chemical Formula 1 does not requires a catalyst or initiator during its synthesis, and thus, there is no concern about removing them, and/or side products or ununiform chain growth generated by them. Moreover, the polymer may be produced by using visible light under mild conditions, and thsu, can be manufactured safer and at lower cost.

DETAILED DESCRIPTION

Figure 1:
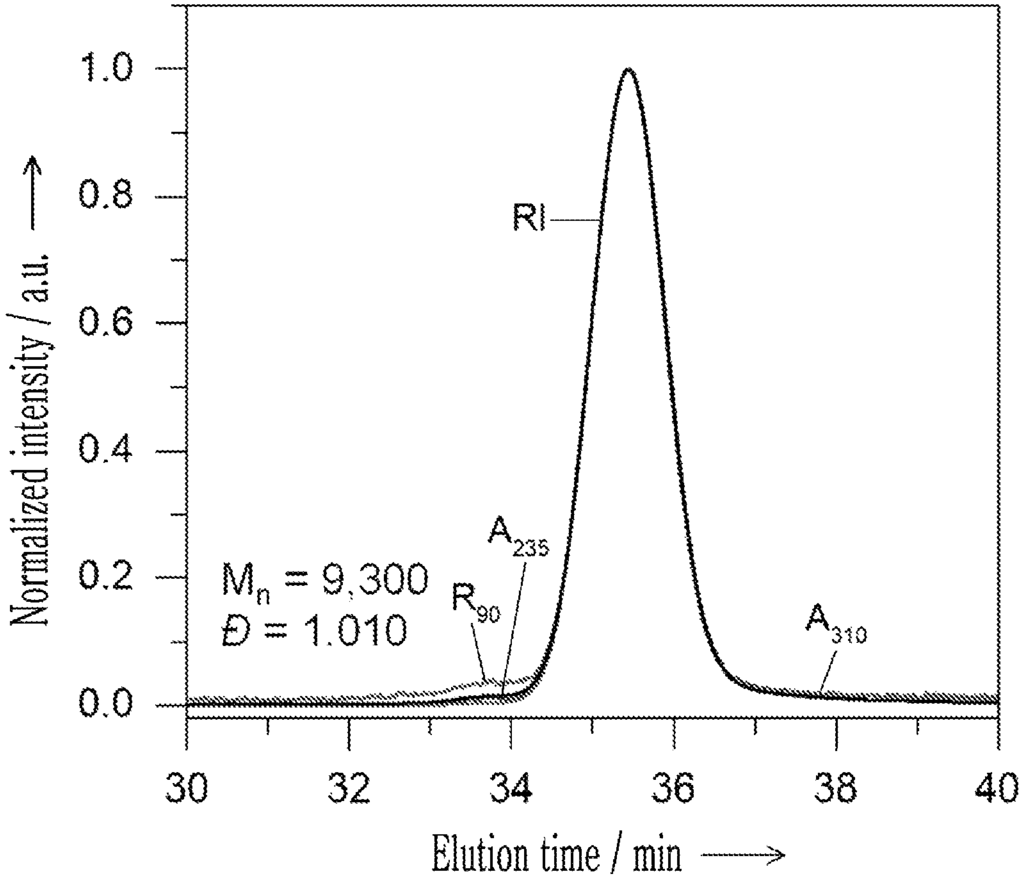
FIGS. 1 to 3 show the MAALS-GPC measurement results of vinyl-based polyols prepared in Examples 1 to 3, respectively.

Hereinafter, some example embodiments will hereinafter be described in detail, and may be easily performed by a person having an ordinary skill in the related art. However, the inventive concepts may be embodied in many different forms and are not to be construed as limited to the example embodiments set forth herein.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In the drawings, parts having no relationship with the description are omitted for clarity of the embodiments, and the same or similar constituent elements are indicated by the same reference numeral throughout the specification.

As used herein, when a definition is not otherwise provided, "substituted" refers to replacement of hydrogen of a compound by a halogen atom (F, Br, Cl, or I), a hydroxy group, a nitro group, a cyano group, an amino group, an azido group, an amidino group, a hydrazino group, a hydrazono group, a carbonyl group, a carbamoyl group, a thiol group, an ester group, a carboxyl group or a salt thereof, a sulfonic acid group or a salt thereof, a phosphoric acid group or a salt thereof, a C1 to C20 alkyl group, a C1 to C20 alkoxy group, a C2 to C20 alkenyl group, a C2 to C20 alkynyl group, a C6 to C30 aryl group, a C7 to C30 arylalkyl group, a C2 to C20 heteroaryl group, a C3 to C20 heteroarylalkyl group, a C3 to C30 cycloalkyl group, a C3 to C15 cycloalkenyl group, a C6 to C15 cycloalkynyl group, a C2 to C20 heterocycloalkyl group, and any combination thereof.

As used herein, when specific definition is not otherwise provided, "hetero" refers to one including 1 to 3 heteroatoms selected from N, O, S, P, and Si.

As used herein, "an alkyl group" for example refers to a methyl group, an ethyl group, a propyl group, an isopropyl group, an n-butyl group, an isobutyl group, a t-butyl group, a pentyl group, a hexyl group, and the like.

As used herein, "a cycloalkyl group" refers to a cyclopropyl group, a cyclobutyl group, a cyclopentyl group, a cyclohexyl group, and the like.

As used herein, "aryl group" refers to a substituent including all element of the cycle having p-orbitals which form conjugation, and may be a monocyclic, polycyclic or fused polycyclic (e.g., rings sharing adjacent pairs of carbon atoms) functional group.

As used herein, when a definition is not otherwise provided, "a cyano-containing group" refers to a monovalent group such as a C1 to C30 alkyl group, a C2 to C30 alkenyl group, or a C2 to C30 alkynyl group where at least one hydrogen is replaced by a cyano group. The cyano-containing group also refers to a divalent group such as a dicyanoalkenyl group represented by $=CR^{x'}—(CR^xR^y)_p—CRY^{y'}(CN)_2$ wherein $R^x$, $R^y$, $R^{x'}$, and $R^{y'}$ are the same or different and are independently one of hydrogen or a C1 to C10 alkyl group and p is an integer of 0 to 10 (and/or 1 to 10). Specific examples of the cyano-containing group may be a dicyanomethyl group, a dicyanovinyl group, a cyanoethynyl group, and the like.

As used herein, when a definition is not otherwise provided, "a heterocycle" refers to a cycle including at least one heteroatom, wherein the heteroatom may be one of N, O, S, P, or Si and the cycle may be an aliphatic cycle, an aromatic cycle, or a fused cycle (e.g., fused cyclic structure) thereof.

As used herein, when a definition is not otherwise provided, "any combination thereof" refers to at least two substituents bound to each other by a single bond or a C1 to C10 alkylene group, or at least two fused substituents.

As used herein, the term "5-membered aromatic ring" refers to a 5-membered cyclic group (e.g., C5 aryl group) having a conjugation structure or a 5-membered heterocyclic group (e.g., C2 to C4 heteroaryl group) having a conjugation structure. As used herein, the term "6-membered aromatic ring" refers to a 6-membered cyclic group (e.g., C6 aryl group) having a conjugation structure or a 6-membered heterocyclic group (e.g., C2 to C5 heteroaryl group) having a conjugation structure, but is not limited thereto. The aromatic ring may include the 5-membered aromatic ring or the 6-membered aromatic ring, but is not limited thereto.

It will be understood that elements and/or properties thereof may be recited herein as being "identical" to, "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same. It will be understood that elements and/or properties thereof described herein as being "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

While the term "same," "equal" or "identical" may be used in description of some example embodiments, it should be understood that some imprecisions may exist. Thus, when one element is referred to as being the same as another element, it should be understood that an element or a value is the same as another element within a desired manufacturing or operational tolerance range (e.g., ±10%). When the terms "about" or "substantially" are used in this specification in connection with a numerical value, it is intended that the associated numerical value includes a manufacturing or operational tolerance (e.g., ±10%) around the stated numerical value. Moreover, when the words "about" and "substantially" are used in connection with geometric shapes, it is intended that precision of the geometric shape is not required but that latitude for the shape is within the scope of the inventive concepts. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are specified, the range includes all values therebetween such as increments of 0.1%.

Hereinafter, a polymer according to some example embodiments (also referred to herein interchangeably as a novel compound) is described.

The polymer according to some example embodiments is represented by the Chemical Formula 1, a number average molecular weight of the polymer is about 10 to 1,000,000 g/mol, and its polydispersity index is in the range of about 1 to about 1.1:

Chemical Formula 1

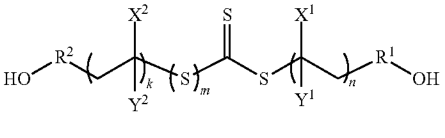

In Chemical Formula 1, $R^1$ and $R^2$ are each independently, a substituted or unsubstituted C1 to C30 alkylene group, a substituted or unsubstituted C3 to C30 cycloalkylene group, a substituted or unsubstituted C2 to C30 heterocycloalkylene group, a substituted or unsubstituted C2 to C30 alkenylene group, a substituted or unsubstituted C6 to C30 arylene group, a substituted or unsubstituted C2 to C30 heteroarylene group, wherein, $—R^aOR^b$, $—R^aC(=O)(NR^c)R^b$, $—R^a(NR^c)R^b—$, $—R^aPO_2R^b—$, $—R^aPO_3R^b—$, $—R^aPO_4R^b—$, $—R^aSO_2R^b—$, $—R^aSO_3R^b$, $—R^aPO_4R^b—$, or a combination thereof, wherein, $R^a$ and $R^b$ are, each independently, a substituted or unsubstituted C1 to C20 alkylene group, a substituted or unsubstituted C3 to C20 cycloalkylene group, a substituted or unsubstituted C2 to C20 heterocycloalkylene group, a substituted or unsubstituted C2 to C20 alkenylene group, a substituted or unsubstituted C6 to C20 arylene group, a substituted or unsubstituted C2 to C20 heteroarylene group, or a combination thereof, and $R^c$ is hydrogen, deuterium, a substituted or unsubstituted C1 to C30 alkyl group, a substituted or unsubstituted C3 to C30 cycloalkyl group, a substituted or unsubstituted C2 to C30 heterocycloalkyl group, a substituted or unsubstituted C2 to C30 alkenyl group, a substituted or unsubstituted C2 to C30 cycloalkenyl group, a substituted or unsubstituted C2 to C30 heterocycloalkenyl group, a substituted or unsubstituted C2 to C30 alkynyl group, a substituted or unsubstituted C3 to C30 cyclo alkynyl group, a substituted or unsubstituted C2 to C30 heterocycloalkynyl group, a substituted or unsubstituted C6 to C30 aryl group, a substituted or unsubstituted C2 to C30 heteroaryl group, a substituted or unsubstituted C1 to C30 acyl group, a substituted or unsubstituted C1 to C30 alkoxy group, a substituted or unsubstituted C6 to C30 aryloxy group, a substituted or unsubstituted C1 to C30 alkylthio group, a substituted or unsubstituted C2 to C30 alkenylthio group, a substituted or unsubstituted C2 to C30 alkynylthio group, or a combination thereof, $X^1$ and $X^2$ are, each independently, hydrogen, deuterium, a substituted or unsubstituted C1 to C30 alkyl group, or halogen atom, $Y^1$ and $Y^2$ are, each independently, hydrogen, deuterium, Halogen atom, hydroxyl group, a substituted or unsubstituted C1 to C30 alkoxy group, a substituted or unsubstituted C6 to C30 aryloxy group, cyano group, nitro group, a ubstituted or unsubstituted amino group, a substituted or unsubstituted C1 to C30 alkyl group, a substituted or unsubstituted C3 to C30 cycloalkyl group, a substituted or unsubstituted C1 to C30 heteroalkyl group, a substituted or unsubstituted C2 to C30 heterocyclo alkyl group, a substituted or unsubstituted C2 to C30 alkenyl group, a substituted or unsubstituted C3 to C30 cyclo alkenyl group, a substituted or unsubstituted C2 to C30 heterocyclo alkenyl group, a substituted or unsubstituted C2 to C30 alkynyl group, a substituted or unsubstituted C3 to C30 cyclo alkynyl group, a substituted or unsubstituted C2 to C30 heterocyclo alkynyl group, a substituted or unsubstituted C6 to C30 aryl group, a substituted or unsubstituted Ringed C3 to C30 heteroaryl group, $—R^aOR^d$, $—R^aC(=O)OR^d$, $—R^aC(=O)(NR^c)R^d$, $—R^a(NR^c)R^d$, $—R^aPO_2R^d$, $—R^aPO_3R^d$, $—R^aPO_4R^d$, $—R^aSO_2R^d$, $—R^aSO_3R^d$, $—R^aPO_4R^d$, or a combination thereof, wherein, $R^a$ is, each independently, single bond, a substituted or unsubstituted C1 to C20 alkylene group, a substituted or unsubstituted C3 to C20 cycloalkylene group, a substituted or unsubstituted C2 to C20 heterocycloalkylene group, a substituted or unsubstituted C2 to C20 alkenylene group, a substituted or unsubstituted C3 to C20 cyclo alkylkenylene group, a substituted or unsubstituted C6 to C20 arylene group, a substituted or unsubstituted C2 to C20 heteroarylene group, or a combination thereof, $R^c$ and $R^d$ are, each independently, hydrogen, deuterium, a substituted or unsubstituted C1 to C30 alkyl group, a substituted or unsubstituted C3 to C30 cycloalkyl group, a substituted or unsubstituted C2 to C30 heterocycloalkyl group, a substituted or unsubstituted C2 to C30 alkenyl group, a substituted or unsubstituted C2 to C30 cycloalkenyl group, a substituted or unsubstituted C2 to C30 heterocycloalkenyl group, a substituted or unsubstituted C2 to C30 alkynyl group, a substituted or unsubstituted C3 to C30 cyclo alkynyl group, a substituted or unsubstituted C2 to C30 heterocycloalkynyl group, a substituted or unsubstituted C6 to C30 aryl group, a substituted or unsubstituted C2 to C30 heteroaryl group, a substituted or unsubstituted C1 to C30 acyl group, a substituted or unsubstituted C1 to C30 alkoxy group, a substituted or unsubstituted C6 to C30 aryloxy group, a substituted or unsubstituted C1 to C30 alkylthio group, a substituted or unsubstituted C2 to C30 alkenylthio group, a substituted or unsubstituted C2 to C30 alkynylthio group, or a combination thereof, m is an integer of 0 or 1, and k is an integer of 0 or more, provided that if m is 0, then k is also 0, and n is an integer of greater than or equal to 1, provided that if n is an integer of 2 or more, then $X^1$ and $Y^1$ in two or more structural units denoted by n are the same as or different from each other, and provided that if k is an integer of 2 or more, then $X^2$ and $Y^2$ in two or more structural units denoted by k are the same as or different from each other.

The polymer represented by Formula 1 may be prepared by a method including stirring a mixture of a compound represented by Chemical Formula 11 and a compound represented by Chemical Formula 12, while irradiating light in visible light region under mild conditions at room temperature in nitrogen atmosphere without using a catalyst or an initiator:

Checmial Formula 11

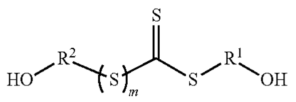

Chemical Formula 12

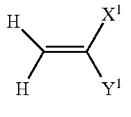

In Chemical Formula 11 and Chemical Formula 12, $R^1$, $R^2$, $X^1$, $Y^1$, and m are the same as defined in Chemical Formula 1 above.

The compound represented by Chemical Formula 11, which may be a so-called 'Chain-transfer Agent (CTA)', may be exposed to light in visible light region to form a "thiocarbonylthio (TCT)" group and $R^1$ or $R^2$ radical via a homolytic cleavage in which the bond between the TCT group and $R^1$ or $R^2$ group is cleaved. The radical formed in this way radically combines with the electrons forming the double bond of the monomer represented by Chemical Formula 12, and thus, the polymer represented by Chemical Formula 1 may be prepared by a structural unit derived from the monomer represented by Chemical Formula 12 being introduced between the thiocarbonylthio (TCT) group and $R^1$ and/or $R^2$ group. Accordingly, the number of k and/or n of the polymer represented by Chemical Formula 1 may be determined by the content of the monomer represented by Chemical Formula 12. In this case, the monomer represented by Chemical Formula 12 may be composed of only one type of monomer, or may be a mixture of two or more types of monomers. When reacting with a mixture including more than one type of monomers, the $X^1$ and $Y^1$, and/or the $X^2$ and $Y^2$ included in each structural unit denoted by 'n' and/or 'k' in the polyer represented by Chemical Formula 1 may be the same as or different from each other in each structural unit.

The polymer represented by Chemical Formula 1 may have a very narrow polydispersity index of about 1 to about 1.1 by being polymerized by the method described above within the range of the number average molecular weight in the above range. In other words, the polymers may be prepared to have a very uniform molecular weight distribution. Also, the polymer may be substituted with hydroxyl groups at both ends, and thus, it can adantageously be used as raw material in various polymerization reactions that use the hydroxyl groups at both ends as functional groups. In this case, the polymer represented by Chemical Formula 1 may include the remaining portions excluding the both ends, and thus, the structure inside the polymer may be maintained without having any change, and thus, various polymers having desired properties or functionality, and required average molecular weight may easily be prepared by adjusting the structural unit represented by n and/or k and its content. Further, type and/or content of the structural units in the polymer represented by Chemical Formula 1 may be varied by appropriately selecting the monomer represented by Chemical Formula 12 in an appropriate amount.

The number average molecular weight of the polymer represented by Chemical Formula 1 may appropriately be adjusted to achieve desired effects within the range of from about 10 g/mol to about 1,000,000 g/mol. For example, the number average molecular weight of the polymer may be from about 10 g/mol to about 1,000,000 g/mol, for example, from about 100 g/mol to about 1,000,000 g/mol, from about 500 g/mol to about 1,000,000 g/mol, from about 1,000 g/mol to about 1,000,000 g/mol, from about 1,500 g/mol to about 1,000,000 g/mol, from about 2,000 g/mol to about 1,000,000 g/mol, from about 2,000 g/mol to about 500,000 g/mol, from about 2,000 g/mol to about 300,000 g/mol, from about 2,000 g/mol to about 100,000 g/mol, from about 2,000 g/mol to about 50,000 g/mol, from about 2,000 g/mol to about 40,000 g/mol, from about 2,000 g/mol to about 30,000 g/mol, from about 2,000 g/mol to about 20,000 g/mol, from about 2,000 g/mol to about 15,000 g/mol, from about 2,000 g/mol to about 10,000 g/mol, from about 2,000 g/mol to about 8,000 g/mol, from about 2,000 g/mol to about 7,000 g/mol, from about 2,000 g/mol to about 5,000 g/mol, from about 2,500 g/mol to about 5,000 g/mol, from about 2,500 g/mol to about 4,500 g/mol, or from about 2,500 g/mol to about 4,000 g/mol, and is not limited thereto.

The polymer represented by Chemical Formula 1 may have a polydispersity index (PDI) of about 1 to about 1.1, and the PDI may further be adjusted to be narrower, for example, in a range of about 1 to about 1.09, about 1 to about 1.08, about 1 to about 1.07, about 1 to about 1.06, about 1 to about 1.05, about 1 to about 1.04, about 1 to about 1.03, about 1 to about 1.02, or about 1 to about 1.01, and is not limited thereto.

Generally, it is not easy to control the PDI of a polymer within a narrow range as described above. However, the polymer according to some example embodiments may have a narrow range of DI as described above. Thereafter, the polymer according to some example embodiments may have the advantage of uniformly exhibiting the properties of the monomer used to form the polymer.

As will be described in more detail below, the polymer represented by Chemical Formula 1, in which both terminals are substituted with hydroxyl groups, may be polymerized into a polyurethane through a reaction with, for example, a diisocyanate compound. In the polyurethane prepared in this way, only the hydroxyl groups present at both ends of the polymer represented by Chemical Formula 1 may react with the isocyanate groups to form urethane bonds, the structural units denoted as n and/or k in Chemical Formula 1 remain unchanged, and the structural units can form a soft portion in the polyurethane.

In Chemical Formula 1 and Chemical Formula 11, $R^1$ and $R^2$ may each independently be a ubstituted or unsubstituted C1 to C20 alkylene group, a substituted or unsubstituted C3 to C20 cycloalkylene group, a substituted or unsubstituted C6 to C20 arylene group, a substituted or unsubstituted C2 to C20 heteroarylene group, $—R^aOR^b—$, $—R^aC(═O)(NR^c)R^b—$, $—R^a(NR^c)R^b—$, or a combination thereof, wherein, $R^a$ and $R^b$ may each independently a substituted or unsubstituted C1 to C10 alkylene group, a substituted or unsubstituted C3 to C10 cycloalkylene group, a substituted or unsubstituted C6 to C10 arylene group, a substituted or unsubstituted C2 to C10 heteroarylene group, or a combination thereof, and $R^c$ may be hydrogen, deuterium, a substituted or unsubstituted C1 to C10 alkyl group, a substituted or unsubstituted C3 to C10 cycloalkyl group, a substituted or unsubstituted C2 to C10 heterocycloalkyl group, a substituted or unsubstituted C2 to C30 alknyl group, a substituted or unsubstituted C6 to C20 aryl group, a substituted or unsubstituted C2 to C20 heteroaryl group, a substituted or unsubstituted C1 to C10 acyl group, or a combination thereof, and is not limited thereto.

In one embodiment, $R^1$ and $R^2$ may each independently, a substituted or unsubstituted C1 to C15 alkylene group, a substituted or unsubstituted C3 to C10 cycloalkylene group, a substituted or unsubstituted C6 to C10 arylene group, a substituted or unsubstituted C2 to C10 heteroarylene group, $—R^aC(═O)(NR^c)R^b—$, or a combination thereof, wherein, $R^a$ and $R^b$ may be each independently, a substituted or unsubstituted C1 to C5 alkylene group, a substituted or unsubstituted C3 to C6 cycloalkylene group, a substituted or unsubstituted C6 to C10 arylene group, or a combination thereof, and $R^c$ may be hydrogen, deuterium, a substituted or unsubstituted C1 to C5 alkyl group, a substituted or unsubstituted C3 to C6 cycloalkyl group, a substituted or unsubstituted C2 to C10 heterocycloalkyl group, a substituted or unsubstituted C2 to C5 alkenyl, a substituted or unsubstituted C2 to C5 alkynyl group, a substituted or unsubstituted C6 to C10 aryl group, a substituted or unsubstituted C2 to C10 heteroaryl group, a substituted or unsubstituted C1 to C10 acyl group, or a combination thereof, and is not limited thereto.

In Chemical Formula 1, $X^1$ and $X^2$ may each independently be hydrogen, deuterium, a substituted or unsubstituted C1 to C20 alkyl group, or a halogen atom, for example, $X^1$ and $X^2$ may each independently be hydrogen, deuterium, a substituted or unsubstituted C1 to C5 alkyl group, or a halogen atom, and is not limited thereto.

In Chemical Formula 1, $Y^1$ and $Y^2$ may each independently be hydrogen, deuterium, a halogen atom, hydroxyl group, a substituted or unsubstituted C1 to C20 alkoxy group, a substituted or unsubstituted C6 to C20 aryloxy group, cyano group, nitro group, a substituted or unsubstituted amino group, a substituted or unsubstituted C1 to C20 alkyl group, a substituted or unsubstituted C3 to C10 cycloalkyl group, a substituted or unsubstituted C1 to C10 heteroalkyl group, a substituted or unsubstituted C2 to C10 heterocyclo alkyl group, a substituted or unsubstituted C2 to C20 alkenyl group, a substituted or unsubstituted C2 to C10 heterocyclo alkenyl group, a substituted or unsubstituted C2 to C20 alkynyl group, a substituted or unsubstituted C6 to C20 aryl group, a substituted or unsubstituted C3 to C20 heteroaryl group, $—R^aOR^d$, $—R^aC(═O)OR^d$, $—R^aC(═O)(NR^c)R^d$, $—R^a(NR^c)R^d$, $—R^aPO_2R^d$, $—R^aPO_3R^d$, $—R^aPO_4R^d$, $—R^aSO_2R^d$, $—R^aSO_3R^d$, $—R^aPO_4R^d$, or a combination thereof, wherein, $R^a$ may each independently be single bond, a substituted or unsubstituted C1 to C10 alkylene group, a substituted or unsubstituted C3 to C10 cycloalkylene group, a substituted or unsubstituted C2 to C10 heterocycloalkylene group, a substituted or unsubstituted C2 to C10 alkenylene group, a substituted or unsubstituted C3 to C10 cycloalkenylene group, a substituted or unsubstituted C6 to C20 arylene group, a substituted or unsubstituted C2 to C20 heteroarylene group, or a combination thereof, and $R^c$ and $R^d$ may independently be hydrogen, deuterium, a substituted or unsubstituted C1 to C10 alkyl group, a substituted or unsubstituted C3 to C10 cycloalkyl group, a substituted or unsubstituted C2 to C10 heterocycloalkyl group, a substituted or unsubstituted C2 to C10 alkenyl group, a substituted or unsubstituted C2 to C10 cycloalkenyl group, a substituted or unsubstituted C2 to C10 heterocycloalkenyl group, a substituted or unsubstituted C2 to C10 alkynyl group, a substituted or unsubstituted C3 to C10 cyclo alkynyl group, a substituted or unsubstituted C6 to C20 aryl group, a substituted or unsubstituted C2 to C20 heteroaryl group, a substituted or unsubstituted C1 to C10 acyl group, a substituted or unsubstituted C1 to C10 alkoxy group, a substituted or unsubstituted C6 to C20 aryloxy group, a substituted or unsubstituted C1 to C10 alkylthio group, a substituted or unsubstituted C2 to C10 alkenylthio group, a substituted or unsubstituted C2 to C10 alkynylthio group, or a combination thereof, and is not limited thereto.

In one embodiment, $Y^1$ and $Y^2$ may each independently be hydrogen, deuterium, a halogen atom, hydroxyl group, a substituted or unsubstituted C1 to C10 alkoxy group, a substituted or unsubstituted C6 to C10 aryloxy group, cyano group, nitro group, a substituted or unsubstituted amino group, a substituted or unsubstituted C1 to C5 alkyl group, a substituted or unsubstituted C3 to C6 cycloalkyl group, a substituted or unsubstituted C1 to C5 heteroalkyl group, a substituted or unsubstituted C2 to C5 heterocyclo alkyl group, a substituted or unsubstituted C2 to C5 alkenyl group, a substituted or unsubstituted C2 to C5 alkynyl group, a substituted or unsubstituted C6 to C10 aryl group, a substituted or unsubstituted C3 to C10 hetero aryl group, $—R^aOR^d$, $—R^aC(═O)OR^d$, $—R^a(NR^c)R^d$, $—R^aC(═O)(NR^c)R^d$, or a combination thereof, R a may be single bond, a substituted or unsubstituted C1 to C5 alkylene group, a substituted or unsubstituted C3 to C6 cycloalkylene group, a substituted or unsubstituted C2 to C5 heterocycloalkylene group, a substituted or unsubstituted C6 to C10 arylene group, a substituted or unsubstituted C2 to C10 heteroarylene group, or a combination thereof, and $R^c$ and $R^d$ may each independently be hydrogen, deuterium, a substituted or unsubstituted C1 to C10 alkyl group, a substituted or unsubstituted C3 to C10 cycloalkyl group, a substituted or unsubstituted C2 to C10 heterocycloalkyl group, a substituted or unsubstituted C2 to C10 alkenyl group, a substituted or unsubstituted C2 to C10 alkynyl group, a substituted or unsubstituted C6 to C10 aryl group, a substituted or unsubstituted C2 to C10 heteroaryl group, or a combination thereof, and is not limited thereto.

From the method of preparing the polymer represented by Chemical Formula 1 described above, it can be seen that $X^1$ and $Y^1$, and $X^2$ and $Y^2$ in Chemical Formula 1 are derived from the functional groups indicated by $X^1$ and $Y^1$ of Formula 12. Accordingly, $X^1$ and $Y^1$ of Formula 12 may be defined the same as those defined for $X^1$ and $Y^1$ in Chemical Formula 1. In addition, as mentioned above, when preparing the polymer represented by Chemical Formula 1, one type or two or more types of monomer represented by Chemical Formula 12 may be used. In this case, when the polymer is prepared by including two or more types of the monomer represented by Chemical Formula 12 $X^1$ and $Y^1$, and $X^2$ and $Y^2$ in Chemical Formula 1 may be the same or different in each structural unit. At this time, depending on the content of each of the two or more types of the monomer represented by Chemical Formula 12, the content of the structural units denoted by n or k may be determined.

In Chemical Formula 1 and Chemical Formula 11, m is an integer of 0 or 1, and if m is 0, then k in Chemical Formula 1 is also 0. That is, the compound represented by Chemical Formula 11 may be a dithiocarbonate compound with two sulfur (S) atoms in the molecule, or, may be a trithiocarbonate compound with three sulfur (S) atoms in the molecule. In Chemical Formula 11, when m is 0, the compound represented by Chemical Formula 11 may be a dithiocarbonate compound. In this case, homolytic-cleavage of the compound by light in visible light region may involve only in the bond between the sulfur (S) atom connected to the carbon of the thiocarbonyl group and $R^1$ connected to the sulfur atom, and the monomer represented by Chemical Formula 12 may be polymerized into the portion where the bond is cleaved through radical bonds. Accordingly, when 'm' of the compound represented by Chemical Formula 11 is 0, both 'm' and 'k' of the polymer represented by Chemical Formula 1 prepared therefrom may be all 0.

Meanwhile, when 'm' in Chemical Formula 11 is 1, in other words, even when the compound represented by Chemical Formula 11 is a trithiocarbonate compound, the reaction may be controlled such that the polymerization reaction between the compound and the monomer represented by Chemical Formula 12 can occur only on one side of the thio (—S—) group. This is possible by appropriately selecting $R^1$ and $R^2$ of the compound represented by Chemical Formula 11. For example, the monomer may be polymerized only between the sulfur (S) atom connected to the carbon of the trithiocarbonate and $R^1$ connected thereto by appropriately selecting $R^1$ and $R^2$ such that equal decomposition occurs only at the bond between the sulfur (S) atom connected to the carbon of the trithiocarbonate and $R^1$ connected thereto. By this polymerization reaction, a polymer represented by Chemical Formula 1, in which m may be 1, and k may be 0, can be prepared.

Examples of the compound represented by Chemical Formula 11 may be exemplified in Group 1, although they are not limited thereto:

Group 1

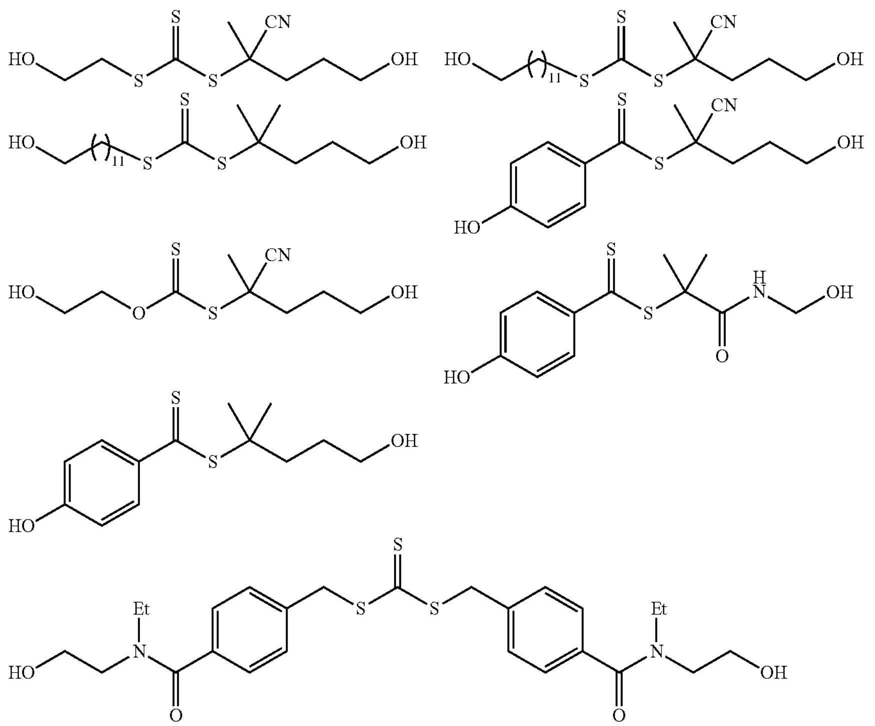

In Group 1, 'Et' represents an ethyl group.

Examples of the monomer represented by Chemical Formula 12 may be, for example, methyl (meth)acrylate, ethyl (meth)acrylate, propyl (meth)acrylate, isopropyl (meth) acrylate, lauryl (meth)acrylate, 2-ethylhexyl (meth)acrylate, dicyclopentadiene (meth)acrylate, dicyclopentenyloxyethyl (meth)acrylate, dicyclopentenyl (meth)acrylate, isobornyl (meth)acrylate, (meth)acrylamide, N, N-Dimethyl (meth) acrylamide, (meth)acryloylmorpholine, isobutoxymethyl (meth)acrylamide, t-octyl (meth)acrylamide, diacetone (meth)acrylamide, ethyldiethylene glycol (meth)) Acrylate, ethyldiethylene glycol (meth)acrylate, polyethylene glycol mono (meth)acrylate, polypropylene glycol mono (meth) acrylate, bornyl (meth)acrylate, methyltriethylene glycol (meth) acrylate, ethylene glycol di(meth)acrylate, dicyclopentenyl di(meth)acrylate, triethylene glycol diacrylate, tetraethylene glycol di(meth)acrylate, tricyclodecane diyldimethylene di(meth) acrylate, tris(2-hydroxyethyl) isocyanurate di(meth)acrylate, tris(2-hydroxyethyl) isocyanurate tri(meth)acrylate, trimethylolpropane tri(meth) acrylate, tri Propylene glycol di(meth)acrylate, neopentyl glycol di(meth)acrylate, 1,4-butanediol di(meth)acrylate, 1,6-hexanediol di(meth)acrylate, pentaerythritol tri(meth) acrylate) acrylate, pentaerythritol tetra(meth)acrylate, polyester di(meth)acrylate, polyethylene glycol di(meth)acrylate, di pentaerythritol penta(meth)acrylate, di pentaerythritol tetra(meth)acrylate, trimethylolpropane tetra (meth)acrylate, tetrachlorophenyl (meth)acrylate, 2-tetrachlorophenoxyethyl (meth)acrylate, tetrahydrofurfuryl (meth)acrylate, tetrabromo Phenyl (meth)acrylate, 2-tetrabromophenoxyethyl (meth)acrylate, 2-trichlorophenoxyethyl (meth)acrylate, tribromophenyl (meth)acrylate, 2-tribromophenoc Cyethyl (meth)acrylate, 2-hydroxyethyl (meth)acrylate, 2-hydroxypropyl (meth)acrylate, phenoxyethyl (meth)acrylate, butoxyethyl (meth)acrylate, pentachlorophenyl (meth)acrylate, pentabromophenyl (meth)acrylate, and the like, and are not limited thereto.

For example, the polymer represented by Chemical Formula 1 may be represented by Chemical Formula 2:

Chemical Formula 2

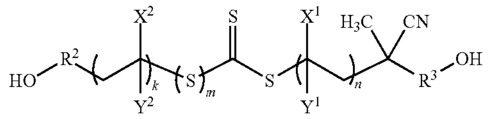

In Chemical Formula 2, $R^2$, $X^1$, $X^2$, $Y^1$, $Y^2$, k, m, and n are the same as defined in Chemical Formula 1 above, $R^3$ may be a substituted or unsubstituted C1 to C10 alkylene group, a substituted or unsubstituted C2 to C10 alkenylene group, a substituted or unsubstituted C2 to C10 alkynylene group, a substituted or unsubstituted C3 to C6 cycloalkylene group, a substituted or unsubstituted C6 to C10 arylene group, a substituted or unsubstituted C3 to C10 heteroarylene group, $—R^eC(=O)(NR^c)R^f—$, or a combination thereof, wherein, $R^e$ and $R^f$ may each independently, single bond, a substituted or unsubstituted C1 to C5 alkylene group, a substituted or unsubstituted C3 to C6 cycloalkylene group, a substituted or unsubstituted C6 to C10 arylene group, or a combination thereof, and $R^c$ may be hydrogen, deuterium, a substituted or unsubstituted C1 to C5 alkyl group, a substituted or unsubstituted C3 to C6 cycloalkyl group, a substituted or unsubstituted C2 to C10 heterocycloalkyl group, a substituted or unsubstituted C2 to C5 alkenyl group, a substituted or unsubstituted C2 to C5 alkynyl group, a substituted or unsubstituted C6 to C10 aryl group, a substituted or unsubstituted C2 to C10 heteroaryl group, a substituted or unsubstituted C1 to C10 acyl group, or a combination thereof.

For example, in Chemical Formula 2, $X^1$ and $X^2$ may each independently, hydrogen, deuterium, or a substituted or unsubstituted C1 to C5 alkyl group, $Y^1$ and $Y^2$ may each independently hydrogen, deuterium, cyano group, a substituted or unsubstituted C1 to C5 alkyl group, a substituted or unsubstituted C3 to C6 cycloalkyl group, a substituted or unsubstituted C6 to C10 aryl group, —$R^aC(=O)OR^d$, —$R^aC(=O)(NR^c)R^d$, or a combination thereof, wherein, $R^a$ may each independently, single bond, a substituted or unsubstituted C1 to C5 alkylene group, a substituted or unsubstituted C3 to C6 cycloalkylene group, a substituted or unsubstituted C6 to C10 arylene group, or a combination thereof, and $R^c$ and $R^d$ may each independently, hydrogen, deuterium, a substituted or unsubstituted C1 to C10 alkyl group, a substituted or unsubstituted C3 to C10 cycloalkyl group, a substituted or unsubstituted C6 to C10 aryl group, a substituted or unsubstituted C2 to C10 heteroaryl group, or a combination thereof, and is not limited thereto.

In Chemical Formula 2, as in Chemical Formula 1, m may be 0 or 1, and if m is 0, then k is also 0, and even when m is 1, k may be 0. As this is the same as described for the polymer represented by Chemical Formula 1 and its manufacturing method, detailed descriptions are omitted.

The polymer represented by Chemical Formula 1 may also be represented by Chemical Formula 3:

Chemical Formula 3

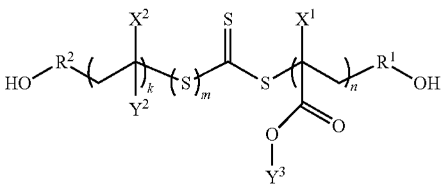

Chemical Formula 3, $R^1$, $R^2$, $X^1$, $X^2$, $Y^2$, k, m, and n are the same as defined in Chemical Formula 1, $Y^3$ is hydrogen, deutrium, a halogen atom, cyano group, a substituted or unsubstituted amino group, a substituted or unsubstituted C1 to C30 alkyl group, a substituted or unsubstituted C3 to C30 cycloalkyl group, a substituted or unsubstituted C1 to C30 heteroalkyl group, a substituted or Unsubstituted C2 to C30 heterocyclo alkyl group, a substituted or unsubstituted C2 to C30 alkenyl group, a substituted or unsubstituted C3 to C30 cyclo alkenyl group, a substituted or unsubstituted C2 to C30 heterocyclo alkenyl group, a substituted or unsubstituted C2 to C30 alkynyl group, a substituted or unsubstituted C3 to C30 cyclo alkynyl group, a substituted or unsubstituted C2 to C30 heterocyclo alkynyl group, a substituted or unsubstituted C6 to C30 aryl group, a substituted or unsubstituted C3 to C30 heteroaryl group, —$R^aOR^d$, —$R^aC(=O)OR^d$, —$R^aC(=O)(NR^c)R^d$, —$R^a(NR^c)R^d$, —$R^aPO_2R^d$, —$R^aPO_3R^d$, —$R^aPO_4R^d$, —$R^aSO_2R^d$, —$R^aSO_3R^d$, —$R^aPO_4R^d$, or a combination thereof, wherein, $R^a$ may be single bond, a substituted or unsubstituted C1 to C20 alkylene group, a substituted or unsubstituted C3 to C20 cycloalkylene group, a substituted or unsubstituted C2 to C20 heterocycloalkylene group, a substituted or unsubstituted C2 to C20 alkenylene group, a substituted or unsubstituted C3 to C20 cycloalkenylene group, a substituted or unsubstituted C6 to C20 arylene group, a substituted or unsubstituted C2 to C20 heteroarylene group, or a combination thereof, $R^c$ and $R^d$ may each independently be, hydrogen, deuterium, a substituted or unsubstituted C1 to C30 alkyl group, a substituted or unsubstituted C3 to C30 cycloalkyl group, a substituted or unsubstituted C2 to C30 heterocycloalkyl group, a substituted or unsubstituted C2 to C30 alkenyl group, a substituted or unsubstituted C2 to C30 cycloalkenyl group, a substituted or unsubstituted C2 to C30 heterocycloalkenyl group, a substituted or unsubstituted C2 to C30 alkynyl group, a substituted or unsubstituted C3 to C30 cycloalkynyl group, a substituted or unsubstituted C2 to C30 heterocycloalkynyl group, a substituted or unsubstituted C6 to C30 aryl group, a substituted or unsubstituted C2 to C30 heteroaryl group, a substituted or unsubstituted C1 to C30 acyl group, a substituted or unsubstituted C1 to C30 alkoxy group, a substituted or unsubstituted C6 to C30 aryloxy group, a substituted or unsubstituted C1 to C30 alkylthio group, a substituted or unsubstituted C2 to C30 alkenylthio group, a substituted or unsubstituted C2 to C30 alkynylthio group, or a combination thereof.

In Chemical Formula 3, $R^1$ and $R^2$ may each independently be, a substituted or unsubstituted C1 to C10 alkylene group, $X^1$ and $X^2$ may each independently be hydrogen, or a C1 to C4 alkyl group, $Y^2$ and $Y^3$ may each independently be, hydrogen, deutrium, a halogen atom, cyano group, a substituted or unsubstituted C1 to C20 alkyl group, a substituted or unsubstituted C3 to C10 cycloalkyl group, a substituted or unsubstituted C6 to C20 aryl group, —$R^aOR^d$, —$R^aC(=O)OR^d$, —$R^aC(=O)(NR^c)R^d$, or a combination thereof, wherein, $R^a$ may be single bond, a substituted or unsubstituted C1 to C20 alkylene group, a substituted or unsubstituted C3 to C20 cycloalkylene group, a substituted or unsubstituted C6 to C20 arylene group, or a combination thereof, and $R^c$ and $R^d$ may each independently be, hydrogen, deuterium, a substituted or unsubstituted C1 to C10 alkyl group, a substituted or unsubstituted C3 to C10 cycloalkyl group, a substituted or unsubstituted C6 to C10 aryl group, or a combination thereof, and is not limited thereto.

In Chemical Formula 3, as in Chemical Formula 1, m may be 0 or 1, and if m is 0, then k is also 0, and even when m is 1, k may be 0. As this is the same as described for the polymer represented by Chemical Formula 1 and its manufacturing method, detailed descriptions regarding this are omitted.

In one embodiment, the polymer represented by Chemical Formula 1 may include a polymer represented by Chemical Formula 3-1 to Chemical Formula 3-5, and is not limited thereto:

Chemical Formula 3-1

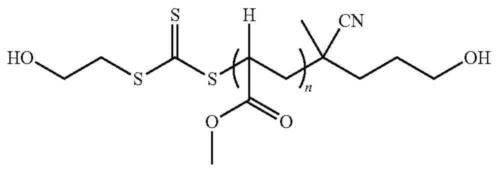

-continued

Chemical Formula 3-2

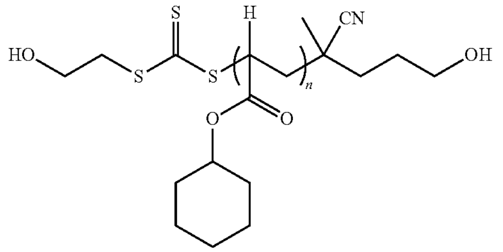

Chemical Formula 3-3

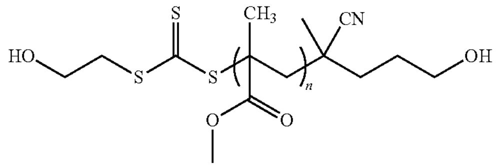

Chemical Formula 3-4

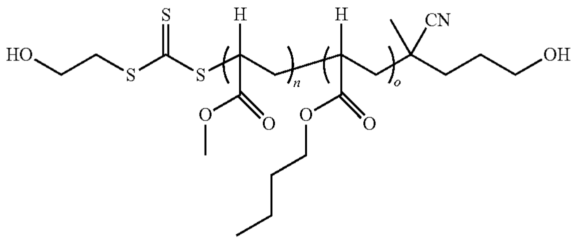

Chemical Formula 3-5

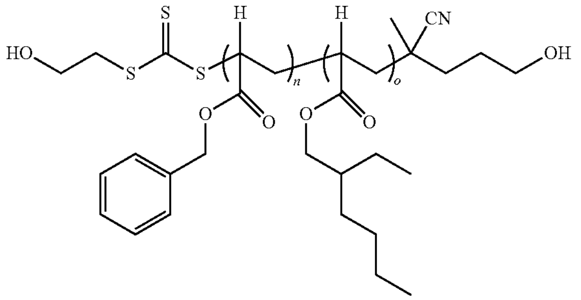

In Chemical Formula 3-1 to Chemical Formula 3-3, n is an integer of 1 or more, and in Chemical Formula 3-4 and Chemical Formula 3-5, n and o are each integer of 0 or more, but n+o is an integer greater than or equal to 1.

Polyurethane (PU) according to some example embodiments may be manufactured by using the polymer represented by Chemical Formula 1.

Polyurethane was first developed by Otto Bayer in 1937 and is one of the most widely used synthetic polymers, with a market worth of $95 billion as of 2019. Polyurethane is used in a wide range of fields, such as, for example, clothing, kitchenware, adhesives, coatings, and the like, due to its excellent chemical or abrasion resistance and low toxicity to the human body.

Polyurethane includes structural units linked by carbamate, i.e., urethane linkage, which is formed by the addition reaction of an isocyanate group (—N═C═O) and a hydroxyl group (—OH). The structural units contain hard segments derived from a compound containing an isocyanate group (—N═C═O) and soft segments derived from polyols containing multiple hydroxyl groups. Polyols includes polyether polyols, polyester polyols, or polycarbonate polyols, which are composed of ether, ester, or carbonate groups, respectively. Phase separation behavior of the strong segments and soft segments changes depending on the type of polyol, and thus, the properties of polyurethane manufactured therefrom can be adjusted by appropriately selecting the polyols.

Polyacrylate polyol has a polymer chain composed of carbon atoms, and thus, it has excellent chemical, UV, and hydrolysis resistance, and has advantages of being able to be introduced by various functional groups. Therefore, polyacrylate polyol may be used to controll various functions and properties of a polymer, and a polyurethane having specific properties may be prepared by using the polyacrylate polyol.

Generally, polyacrylate polyol may be prepared by free radical polymerization of a mixture including a vinyl monomer and a hydroxy alkyl acrylate monomer. In this case, the hydroxy functional groups are randomly dispersed within the prepared polyacrylate polyol. Accordingly, the polyurethane prepared by using the polyacrylate polyol as described above contains uncontrollable crosslinking network, which makes it difficult to achieve desired properties of the polyurethane.

In this regard, it is important to synthesize a polyacrylate polyol having hydroxy groups only at both ends thereof, and the polyurethane prepared therefrom could be an innovative material that could exhibit desired properties of the polyurethane.

In order to achieve the objects, the present inventors have synthesized a polymer represented by Chemical Formula 1 according to some example embodiments, which has a narrow molecular weight distribution, almost no "dead chains", and two hydroxyl functional groups at both ends thereof, by using light in visible light region without using a catalyst or an initiator. Therefore, by reacting at least a portion of the polymer represented by Chemical Formula 1 as a monomer in polymerizing a polyurethane, a polyurethane in which moieties derived from the polymer represented by Chemical Formula 1 form soft segments of the polyurethane, and a method for preparing the polyurethane can be provided. The polyurethane may effectively exert the properties derived from the functional groups contained in the polymer represented by Chemical Formula 1, and thus, the polyurethane according to some example embodiments may be a material that can exhibit excellent properties.

The polyurethane according to some example embodiments may be prepared by reacting the polymer represented by Chemical Formula 1 with a diisocyanate compound represented by Chemical Formula 5:

(Formula 5)

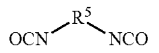

In Chemical Formula 5, $R^5$ is a substituted or unsubstituted C1 to C30 alkylene group, a substituted or unsubstituted C1 to C30 heteroalkylene group, a substituted or unsubstituted C3 to C30 cycloalkylene group, a substituted or unsubstituted C2 to C30 heterocycloalkylene group, a substituted or unsubstituted C2 to C30 alkenylene group, a substituted or unsubstituted C2 to C30 heteroalkenylene group, a substituted or unsubstituted C2 to C30 cycloalkenylene group, a substituted or unsubstituted C2 to C30 heterocycloalkenylene group, a substituted or unsubstituted C2 to C30 alkynylene group, a substituted or unsubstituted C6 to C30 arylene group, a substituted or unsubstituted C2 to C30 heteroarylene group, or a combination thereof, and is not limited thereto.

As the polymer represented by Chemical Formula 1 is a polymer in which both ends are substituted with hydroxyl groups, the polymer and the diisocyanate compound represented by Chemical Formula 5 can be polymerized in a mole ratio of 1:1. Accordingly, the polyurethane according to some example embodiments may be prepared from a mixture containing only the polymer represented by Chemical Formula 1 and the diisocyanate represented by Chemical Formula 5 in an equivalent mole ratio of 1:1. However, the polyurethane according to some example embodiments may also be prepared from a mixture that further includes an additional diol in addition to the polymer and the diisocyanate. The diol compound can be represented by Chemical Formula 4:

Chemical Formula 4

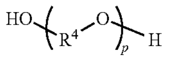

In Chemical Formula 4, $R^4$ is a substituted or unsubstituted C1 to C30 alkylene group, a substituted or unsubstituted C1 to C30 heteroalkylene group, a substituted or unsubstituted C3 to C30 cycloalkylene group, a substituted or unsubstituted C2 to C30 heterocycloalkylene group, a substituted or unsubstituted C2 to C30 alkenylene group, a substituted or unsubstituted C2 to C30 heteroalkenylene group, a substituted or unsubstituted C2 to C30 cycloalkenylene group, a substituted or unsubstituted C2 to C30 heterocycloalkenylene group, a substituted or unsubstituted C2 to C30 alkynylene group, a substituted or unsubstituted C6 to C30 arylene group, a substituted or unsubstituted C2 to C30 heteroarylene group, or a combination thereof, and is not limited thereto, and p is an integer of greater than or equal to 1.

By further including the diol represented by Chemical Formula 4, the polyurethane according to some example embodiments manufactured therefrom may exert more diverse and/or beneficial effects derived from the functional groups and/or structural units derived from the diol compound.

As the diol represented by Chemical Formula 4 also has hydroxy groups substituted at both ends, both the diol and the polymer represented by Chemical Formula 1 can react with an isocyanate functional group of the diisocyanate compound represented by Chemical Formula 5. Accordingly, the compound represented by Chemical Formula 4 and the polymer represented by Chemical Formula 1 may be mixed in an appropriate ratio in consideration of the functional groups contained in each compound or polymer and properties of the polymer derived therefrom to achieve desired purposes. For example, the compound represented by Chemical Formula 4 and the polymer represented by Chemical Formula 1 may be present in a weight ratio of about 1:99 to about 90:10, for example, about 10:90 to about 90:10, about 15:85 to about 85:15, about 20:80 to about 80:20, about 30:70 to about 70:30, about 40:60 to about 60:40, or about 50:50, and is not limited thereto.

For example, the diol compound represented by Chemical Formula 4 may include compounds represented by Chemical Formula 4-1 to Chemical Formula 4-4:

Chemical Formula 4-1

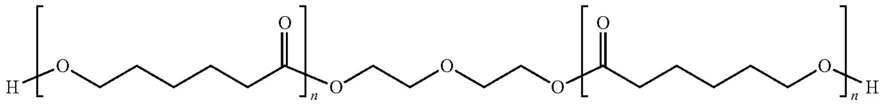

Chemical Formula 4-2

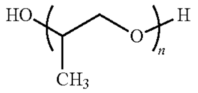

Chemical Formula 4-3

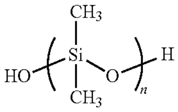

Chemical Formula 4-4

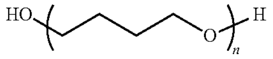

In Chemical Formula 4-1, each n is an integer of greater than or equal to 0, and in Chemical Formula 4-2 to Chemical Formula 4-4, each n is an integer of greater than or equal to 1.

For example, the diisocyanate compound represented by Chemical Formula 5 may include compounds represented by Chemical Formula 5-1 to Chemical Formula 5-7, and is not limited thereto:

Chemical Formula 5-1

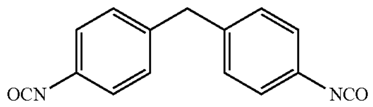

Chemical Formula 5-2

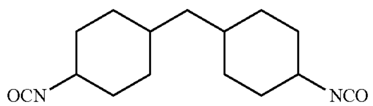

Chemical Formula 5-3

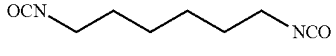

-continued

Chemical Formula 5-4

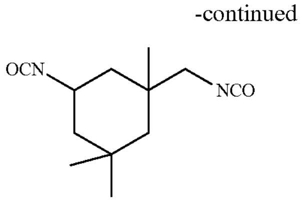

Chemical Formula 5-5

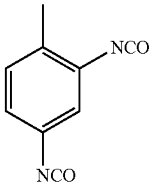

Chemical Formula 5-6

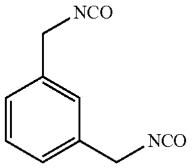

Chemical Formula 5-7

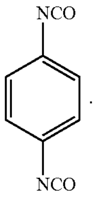

Meanwhile, when prepaing the polyurethane, in addition to the compounds represented by Chemical Formula 4 and Chemical Formula 5, one or more of the compound represented by Chemical Formula 6 or the compound represented by Chemical Formula 7 may further be used to react:

Chemical Formula 6

$$HO—R^6—OH$$

Chemical Formula 7

$$H_2NR^7—NH_2$$

In Chemical Formula 6 and Chemical Formula 7, $R^6$ and $R^7$ may each independently be a substituted or unsubstituted C1 to C30 alkylene group, a substituted or unsubstituted C3 to C30 cycloalkylene group, a substituted or unsubstituted C1 to C30 heteroalkylene group, a substituted or unsubstituted C2 to C30 alkenylene group, a substituted or unsubstituted C3 to C30 cycloalkenylene group, a substituted or unsubstituted C2 to C30 heteroalkynylene group, a substituted or unsubstituted C2 to C30 alkynylene group, a substituted or unsubstituted C3 to C30 cycloalkynylene group, a substituted or unsubstituted C2 to C30 heteroalkynylene group, a substituted or unsubstituted C6 to C30 arylene group, a substituted or unsubstituted C2 to C30 heteroarylene group, or a combination thereof, and is not limited thereto.

As can be seen from Chemical Formula 6 and Chemical Formula 7, the compound represented by Chemical Formula 6 is a diol compound having hydroxy groups at both ends, and the compound represented by Chemical Formula 7 is a diamine compound having amino groups at both ends. When preparing polyurethane according to some example embodiments, the compound represented by Chemical Formula 6 and the compound represented by Chemical Formula 7 are chain extenders that extend the chain length of the polyurethane prepared from the polymerization reaction of a mixture including the polymer represented by Chemical Formula 1, the diisocyanate compound represented by Chemical Formula 5, and optionally, the diol compound represented by Chemical Formula 4 by further reacting with the functional groups of the polyurethane.

For example, as the compound represented by Chemical Formula 6 contains hydroxy groups at both ends, the compound may further react with the unreacted isocyanate groups of the polyurethane prepared from the polymerization reaction of the polymer represented by Chemical Formula 1, a diisocyanate compound represented by Chemical Formula 5, and optionally, the diol compound represented by Chemical Formula 4 to produce an additional carbamate (or urethane) linkage. In addition, as the compound has hydroxy groups at both ends, each end of the compound may react with a functional group of two different polyurethane chains to produce urethane linkages at both ends, whereby the prepared polyurethane may have a chain length of approximately two times of the initially prepared polyurethane.

Meanwhile, the compound represented by Chemical Formula 7 contains amino groups at both ends, and the amino groups may further react with the unreacted isocyanate group of the terminal of the polyurethane to form a urea bond. Accordingly, when the compound represented by Chemical Formula 7 is included as a chain extender and further reacted with polyurethane, each amino group at both ends of the compound represented by Chemical Formula 7 reacts with unreacted isocyanate group of two different polyurethanes to form a urea bond, and thus, previously prepared polyurethanes are linked at both ends of the compound represented by Chemical Formula 7. Therefore, the chain length of polyurethane may become approximately two times of the initially prepared polyurethane. In addition, a polyurethane urea containing additional urea bonds in addition to urethane bonds may be prepared.

Further, the diol compound represented by Chemical Formula 6 and the diamine represented by Chemical Formula 7 may further be included and reacted to prepare the polyurethane, and in this case, the diol compound represented by Chemical Formula 6 or the diamine compound represented by Chemical Formula 7 may be combined with the terminal isocyanate of initially prepared polyurethane to obtain a polyurethane urea having an extended chain length.

An amount of the diol represented by Chemical Formula 6, and/or the diamine represented by Chemical Formula 7 to be used in preparing the polyurethane may appropriately be determined by considering the molecular weight of the polyurethane to be finally prepared, and/or the type of additional functional group to be included in the polyurethane.

Examples of the diol represented by Chemical Formula 6 may include compounds represented by any of Formulas 8 to 10, and are not limited thereto:

Chemical Formula 8

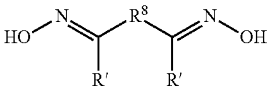

Chemical Formula 9

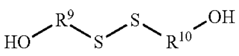

-continued

Chemical Formula 10

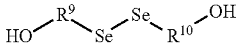

In Chemical Formulas 8 to 10, $R^8$ to $R^{10}$ may each independently be a substituted or unsubstituted C1 to C30 alkylene group, a substituted or unsubstituted C3 to C30 cycloalkylene group, a substituted or unsubstituted C1 to C30 heteroalkylene group, a substituted or unsubstituted C2 to C30 alkenylene group, a substituted or unsubstituted C3 to C30 cycloalkenylene group, a substituted or unsubstituted C2 to C30 heteroalkynylene group, a substituted or unsubstituted C2 to C30 alkynylene group, a substituted or unsubstituted C3 to C30 cycloalkynylene group, a substituted or unsubstituted C2 to C30 heteroalkynylene group, a substituted or unsubstituted C6 to C30 arylene group, a substituted or unsubstituted C2 to C30 heteroarylene group, or a combination thereof, and in Chemical Formula 8, R' may be hydrogen, deutrium, a substituted or unsubstituted C1 to C30 alkyl group, a substituted or unsubstituted C3 to C30 cycloalkyl group, a substituted or unsubstituted C1 to C30 heteroalkyl group, a substituted or unsubstituted C2 to C30 alkenyl group, a substituted or unsubstituted C3 to C30 cycloalkenyl group, a substituted or unsubstituted C2 to C30 heteroalkenyl group, a substituted or unsubstituted C2 to C30 alkynyl group, a substituted or unsubstituted C3 to C30 cycloalkynyl group, a substituted or unsubstituted C2 to C30 heteroalkynyl group, a substituted or unsubstituted C6 to C30 aryl group, a substituted or unsubstituted C2 to C30 heteroaryl group, or a combination thereof.

Specific examples of the compound represented by Chemical Formula 6 include the compounds in Group 2 below, and are not limited thereto:

Group 2

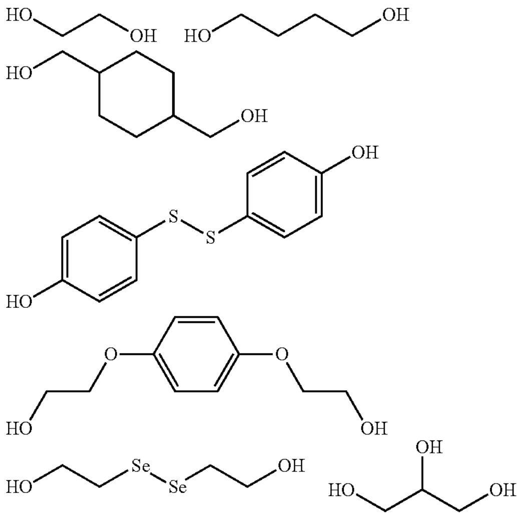

Meanwhile, the polyurethane may be reacted with epichlorohydrin represented by Chemical Formula 13 to substitute at least one of the terminals with a glycidyl group:

Chemical Formula 13

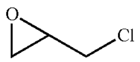

In some example embodiments, both ends of the polyurethane may be substituted with glycidyl groups. When both ends of the polyurethane may be substituted with glycidyl groups, additional linking process of two polyurethane chains may be induced by including and reacting an epoxy ring-opening agent, etc. In this case, it is possible to prepare a polymer having various functions and/or properties that were not possible with conventional epoxy materials. A person skilled in the art to which the invention pertains could repalce glycidyl groups at one or both ends of the polyurethane according to some example embodiments.

Hereinafter, some example embodiments are illustrated in more detail with reference to examples. However, the example embodiments are not limited to these examples.

EXAMPLES

Synthesis Example 1: Synthesis of 2-Cyano-5-hydroxypentanyl(2-hydroxyethyl) carbono trithioate (Hydroxyl-CTA), a Chain Transfer Agent A chain transfer agent (CTA), 2-cyano-5-hydroxypentanyl (2-hydroxyethyl) carbono trithioate, which is substituted with hydroxy groups at both ends, is synthesized as shown in Reaction Scheme 1, Reaction Scheme 1

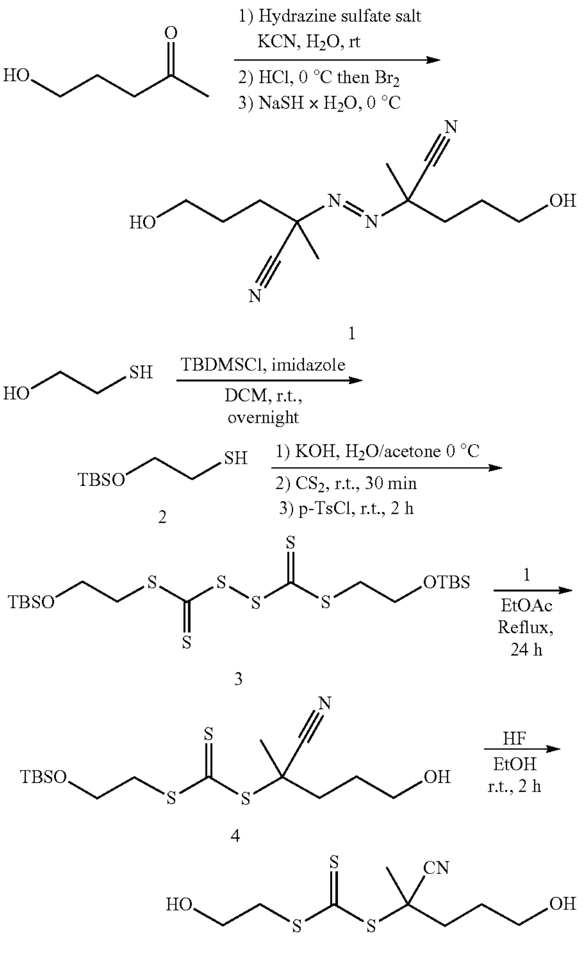

(1) Synthesis of Compound 1(4-4'-azobis(4-cyano-1-pentanol)

Hydrazine sulfate salt (2.0 g, 15.4 mmol) and 5-hydroxy-2-pentanone (mixture of monomer and dimer, 3.1 g, 30.8 mmol) are dissolved in 25 mL of deionized water (DI water), and aqueous solution of potassium cyanide (2.0 g, 30.8 mmol in 14 mL DI water) is added thereto at room temperature for 1 hour. After stirring the reactants at room temperature for 12 hours, 15% aqueous hydrochloric acid is added to adjust pH to 2 at 0° C. Then, bromine (4.5 g, 28.0 mmol) is added and stirred at 0° C. for 3 hours. Afterwards, sodium hydrosulfide hydrate is added to remove residual bromine, the organic material is extracted with ethyl acetate and water, and the solvent is removed in vacuum. Then, it is purified by using a silica gel column ($CH_2Cl_2$/EtOAc (1/4: v/v)), and the compound indicated as 1 in Reaction Scheme 1 is obtained as white solid (1.2 g, yield 31%).

(2) Synthesis of Compound 2 (2-((tert-butyldimethylsilyl) oxy) ethane-1-thiol)

2-mercaptoethanol (4.66 g, 59.4 mmol) and imidazole (4.86 g, 71.28 mmol) are dissolved in 25 mL of anhydrous dichloromethane (DCM), and tert-butyldimethylsilyl chloride solution (10.75 g of tert-butyldimethylsilyl chloride solution (TBMDSCl) in 20 mL of 71.28 mmol anhydrous DCM) is added thereto at 0° C. After stirring at room temperature for 16 hours, organic material is extracted with dichlormethane and water, and the solvent is removed in vacuum. Afterwards, it is purified by using a silica gel column ($CH_2Cl_2$/hexanes (1/3:v/v)), and the compound indicated 2 in Reaction Scheme 1 is obtained as transparent liquid (11.4 g, yield 99%).

(3) Synthesis of Compound 3 (bis(((2-tert-butyldimethylsilyl) oxy)ethyl mercaptothiocarbonyl) disulfide))

The prepared compound 2 (2-((tert-butyldimethylsilyl) oxy)ethane-1-thiol, 3.63 g, 18.9 mmol) is dissolved in 60 mL of water and 15 mL of acetone, and 50% potassium hydroxide (50% aq. KOH, 2.4 mL) is added thereto at 0° C. Afterwards, carbon disulfide (3.0 g, 39.3 mmol) is added at room temperature, and stirred at room temperature for 30 minutes. Then, toluenyl chloride (p-toluenesulfonyl chloride, 1.77 g, 9.3 mmol) is added and stirred at room temperature for additional 2 hours. After the reaction is completed, the organic material is extracted with dichlormethane and water, and the solvent is removed in vacuum. Then, it is purified by using a silica gel column ($CH_2Cl_2$/hexane (1/2, v/v)) to obtain the compound represented by 3 in Reaction Scheme 1 as yellow liquid (3.79 g, yield 75%).

(4) Synthesis of Compound 4 (2-((tert-butyldimethylsilyl)oxy)ethyl (2-cyano-5-hydropenta-2-yl) carbonotrithioate)

The prepared compound 3 (bis(((2-tert-butyldimethylsilyl)oxy)ethyl mercaptothiocarbonyl) disulfide (3), 2.84 g, 5.31 mmol)) and the compound 1 (4,4'-azobis (4-cyano-1) Dissolve-pentanol (1), 1.5 g, 5.94 mmol) are dissolved in 60 mL of anhydrous ethyl acetate and stirred at 75° C. for 24 hours. Then, the solvent is removed in vacuum and purified using a silica gel column (EtOAc/hexanes (1/2, v/v)). Yellow liquid, which is the compound represented by 4 in Reaction Scheme 1, is obtained (1.2 g, yield 60%).

(5) Synthesis of 2-cyano-5-hydroxypentanyl (2-hydroxyethyl) carbonotrithioate (Hydroxyl-CTA)) Synthesis The prepared compound 4 (2-((tert-butyldimethylsilyl) oxy)ethyl (2-cyano-5-hydroxypentan-2-yl) carbonotrithioate (4), 1.0 g, 2.63 mmol) is dissolved in 20 mL of absolute ethanol, and aqueous solution of hydrofluoric acid (48-51% aq. HF, 2.0 mL) is added at 0° C. After stirring at room temperature for 2 hours, the reaction is terminated by adding 5 mL of saturated sodium bicarbonate ($NaHCO_3$) aqueous solution. Then, the organic material is extracted with dichlormethane and water, and the solvent is removed in vacuum. Then, it is purified by using a silica gel column ($CH_2Cl_2$/EtOAc (5/1, v/v)) to obtain the final product, 2-cyano-5-hydroxyfentanyl (2-hydroxyethyl) carbonotrithioate as a yellow liquid (0.66 g, yield 95%).

Examples 1 to 3: Synthesis of Vinyl-Based Polyols with Narrow Molecular Weight Distributions Hydroxyl-CTA, a chain transfer agent, prepared in Synthesis Example 1, and vinyl monomers are mixed to react to produce a polymer represented by Chemical Formula 1 according to some example embodiments, as shown in Reaction Scheme 2:

Reaction Scheme 2

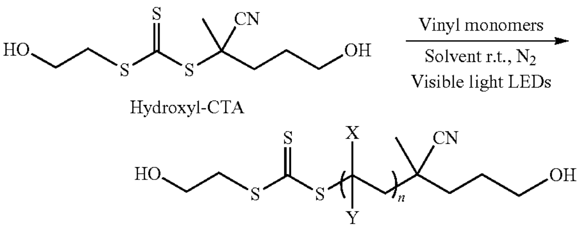

Hydroxyl-CTA

Vinyl-polyol

Figure 2:
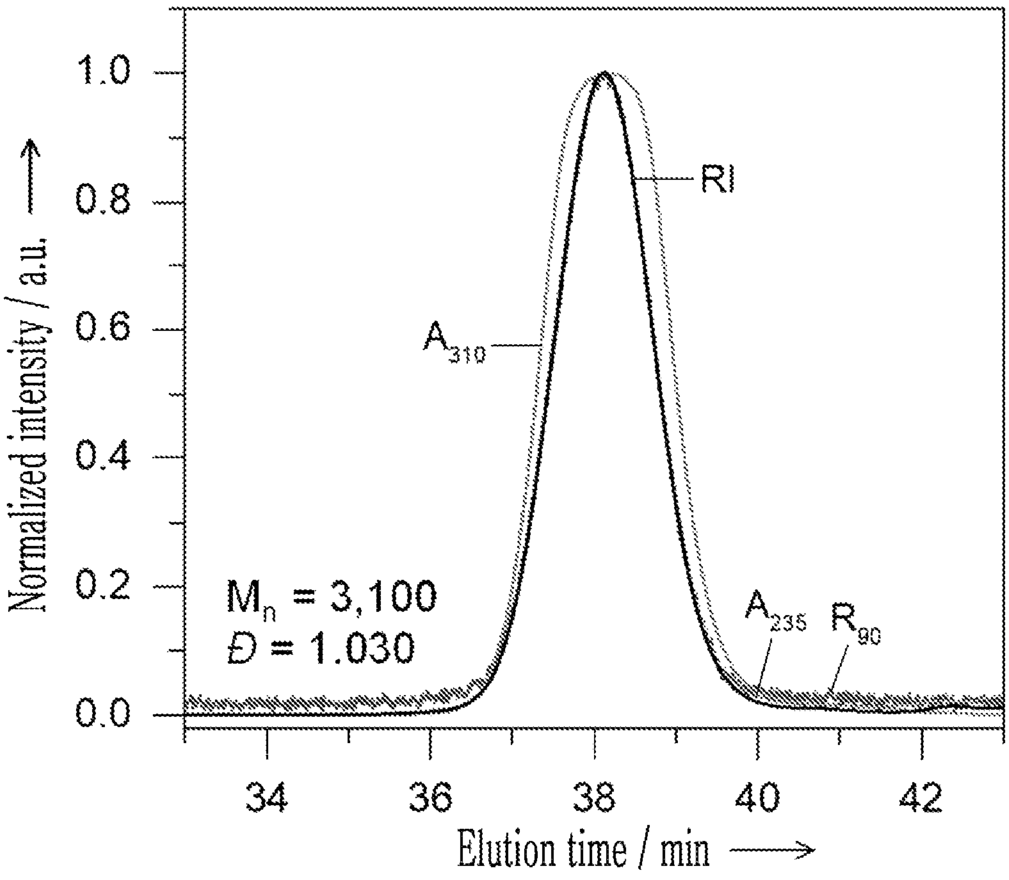
Figure 3:
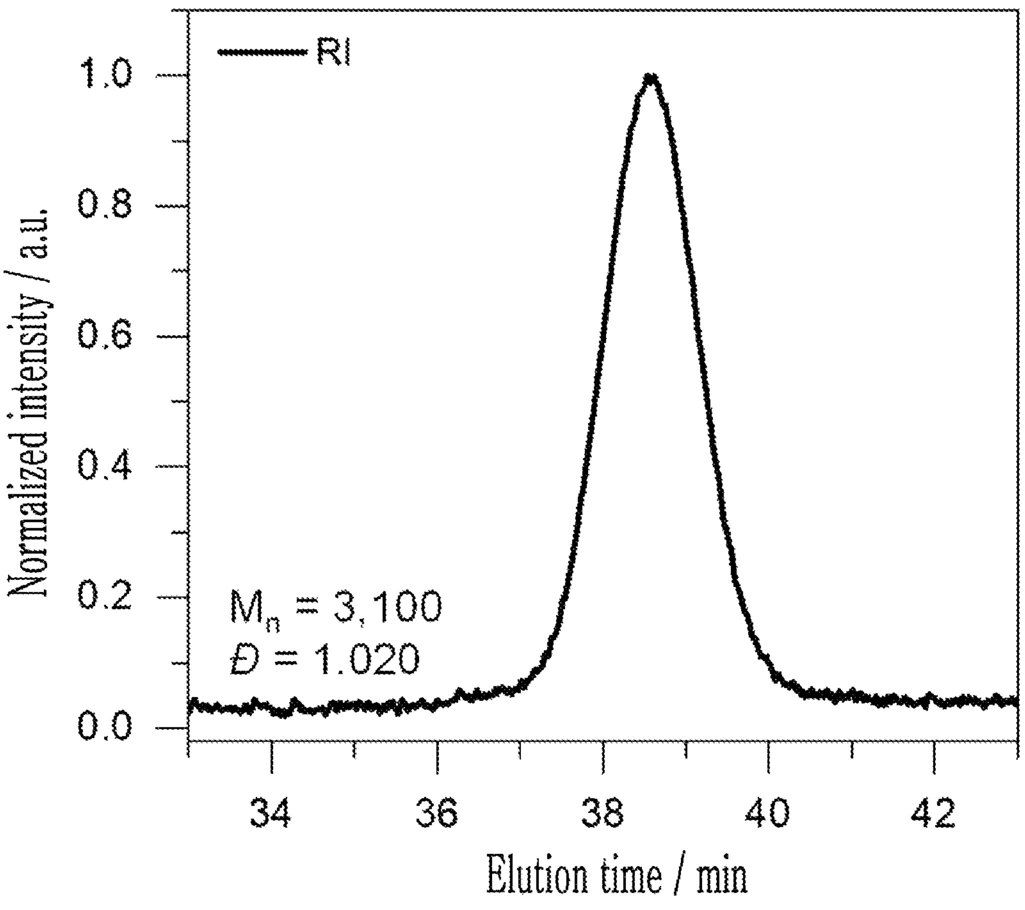

Prior to performing the polymerization reaction, inhibitors of the monomers to be used in the polymerization reaction are firstly removed through an alumina oxide column. Then, each monomer for polymerization and the chain transfer agent, hydroxyl-CTA, prepared in Synthesis Example 1, are mixed at a certain ratio and added to a glass vial. In this case, solvent is optionally injected, if needed, at a volume ratio of 1:1 compared to the monomer. Afterwards, the vials are sealed with rubber septa and parafilms. Then, oxygen is removed by using 99.999% nitrogen gas while stirring. Afterwards, the mixture is irradiated with light by using LED (light emitting diode)(100 mW/$cm^2$) of 455 nm wavelength, while stirring, at room temperature. After a certain period of time, through $^{1H}$ NMR and MAALS-GPC (Multi Angle Light Scattering-Gel Permeation Chromatography) analysis, conversion rate of each polymerization reaction, molecular weight of the produced polymer (vinyl-based polyol), and molecular weight distributions (polydispersity index) are analyzed. The results are shown in Table 1 below. Further, FIGS. 1 to 3 show the MAALS-GPC measurement results of the vinyl-based polyols prepared in Examples 1 to 3, respectively.

When measuring MAALS-GPC, refractive index (RI) detector, Ultraviolet-visible (UV-Vis) absorption detector, and a multi-angle light scattering (MAALS) detectors are used. The UV-vis absorption detector detects at two wavelength regions of 235 nm and 310 nm. These detection signals are denoted as $A_{235}$ and $A_{310}$ in FIGS. 1 and 2. In the MAALS detector, light scattered in the vertical direction of the sample is detected among various angles, and the detection signal is denoted as $R_{90}$ in FIGS. 1 and 2. For the polymer prepared in Example 3, only the RI detector was used.

TABLE 1

| Example number | monomer type | molar ratio of Monomer:Hydroxyl-CTA | solvent | reaction time (h) | Conversion Rate (%) | Theoretical Molecular weight of the polymer (g/mol) | Measured Molecular Weight of the polymer (g/mol) | Polydispersity index (PDI) |
|---|---|---|---|---|---|---|---|---|
| 1 | methyl acrylate | 1 00:1 | dimethyl Sulfoxide | 16 | 94 | 8,400 | 9,300 | 1.01 |
| 2 | n-butyl acrylate | 2 5:1 | not used | 36 | 91 | 2,800 | 3,100 | 1.03 |
| 3 | Methyl Acrylate & n-Butyl Acrylate | 12.5:12.5:1 | not used | 36 | 83 | 2,500 | 3,100 | 1.02 |

As shown from Table 1 and FIGS. 1 to 3, a vinyl-based polyol having a very narrow molecular weight distribution, for example, of less than or equal to 1.1, for example, less than or equal to 1.05, or less than or equal to 1.03, can be prepared by using the chain transfer agent (hydroxyl-CTA) prepared in Synthesis Example 1 and monomers, at room temperature, without using a catalyst or initiator, and by using light in visible light region. The conversion rate of the polyol is high, for example, greater than or equal to about 80%, for example, greater than or equal to about 83%, the reaction time of the polymerization is short as less than or equal to one day, or less than or equal to two days, and the number average molecular weight of the polymer is appropriate.

Examples 4 to 6: Preparations of Polyurethanes with Narrow Molecular Weight Distributions Before the polymerization reaction of the polyurethane in accordance with Reaction Scheme 3, the vinyl-based polyols prepared in Examples 1 to 3 are dried. Specifically, the vinyl-based polyols prepared in each Example and additional polyols are added to the reactor, and maintained at reduced pressure at 100° C. for 1 hour by using a vacuum pump. Afterwards, the temperature of the reactor is rduced to 70° C., and a diisocyanate compound and dibutyl tin dilaurate (DBTDL) catalyst are dissolved in a solvent to be added to the reactor to prepare a prepolymer. After reacting for 2 hours, additional solvent is added, a diol compound as a chain extender is added, and the reaction proceeds for additional 12 hours. Afterwards, the completion of the reaction is confirmed through FT-IR (Fourier Transform-Infrared Spectrometry) measurement, and the molecular weight and molecular weight distribution of the polyurethane expressed in Reaction Scheme 3 are analyzed through GPC measurement.

Reaction Scheme 3

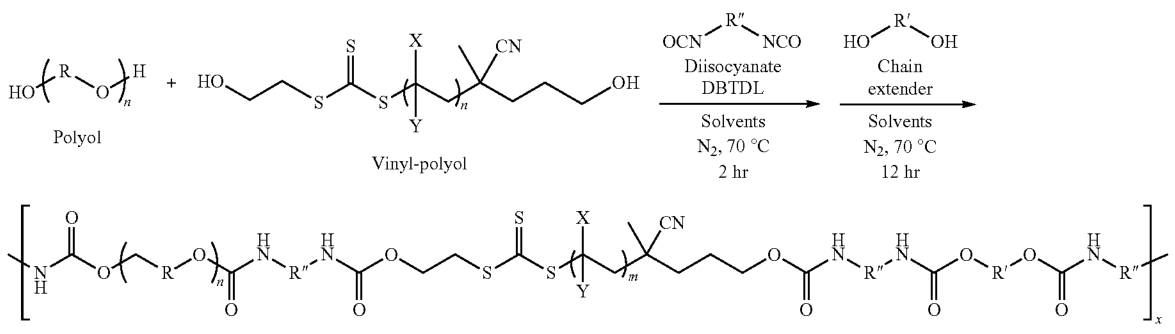

Specific monomers and reaction conditions according to each example, and the molecular structures of the polyurethane prepared therefrom are as follows.

(1) Example 4 and Comparative Examples 1 and 2: Preparation of Polyurethanes

Vinyl-based polyol (h-PBA) (number average molecular weight of about 3,100 g/mol) prepared from n-butyl acrylate and hydroxyl-CTA prepared in Example 2, poly tetramethylene ether glycol (PTMEG)(Cas No.: 25190-06-1; number average molecular weight of about 1,000 g/mol), and isophorone diisocyanate (IPDI) (Cas No.: 4098-71-9) as a diisocyanate compound are used as starting materials, and toluene is used as a solvent. Ethylene glycol (EG) (Cas No.: 107-21-1) is used as a chain extender, and polymerization reaction was performed by mixing PTMEG, h-PBA, EG, and IPDI at a molar ratio of 0.95:0.05:2:3 of PTMEG:h-PBA:EG:IPDI (Example 4).

Meanwhile, without using h-PBA, for comparison, PTMEG:EG:IPDI in a molar ratio of 1:1:2 (Comparative Example 1), or in a molar ratio of 1:2:3 (Comparative Example 2) is proceeded with the same polymerization reaction to prepare polyuethane.

Figure 4:
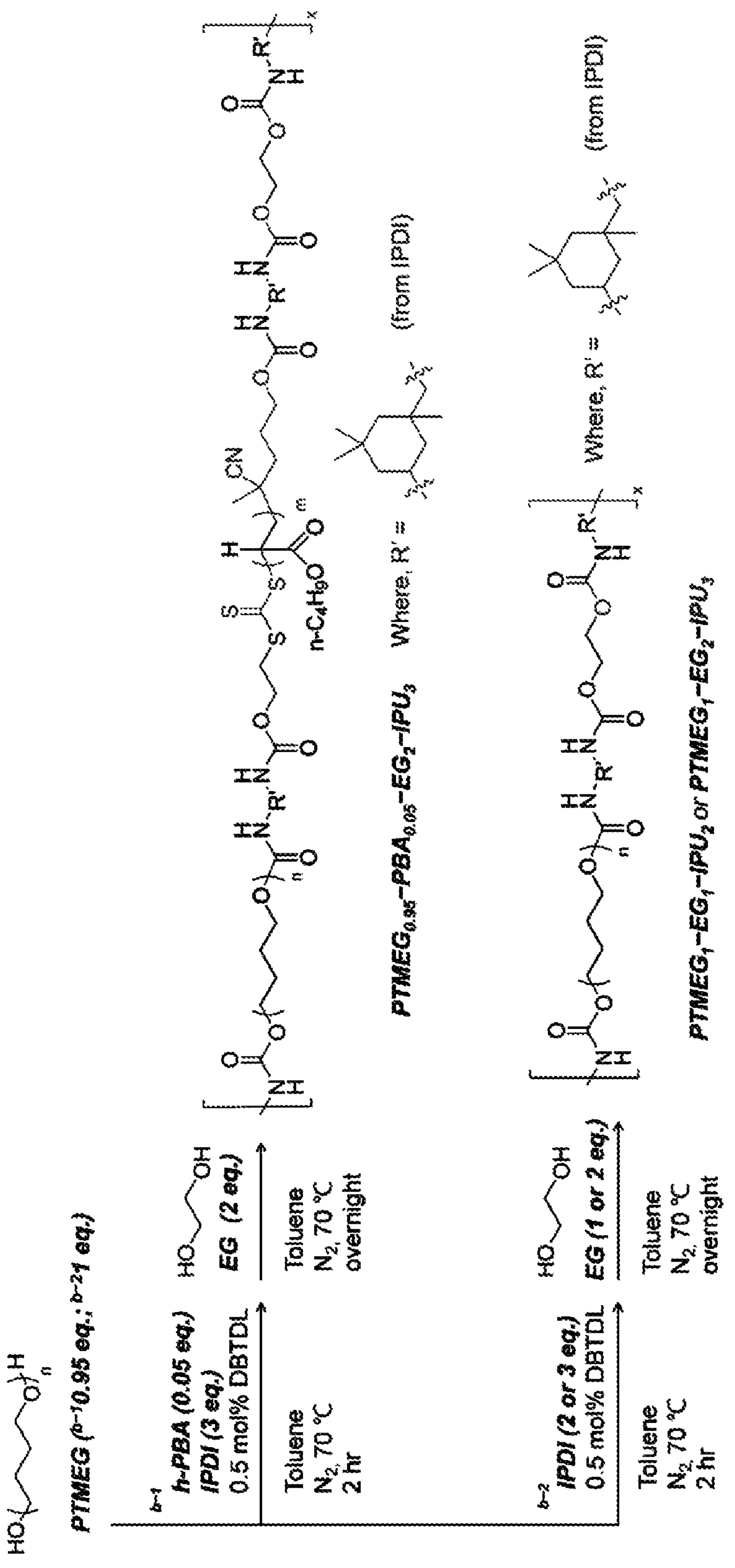
FIG. 4 shows the manufacturing process of polyurethane according to Example 4 and Comparative Examples 1 and 2, and reaction formulae showing the chemical structures of the polyurethane prepared therefrom.
Figure 5:
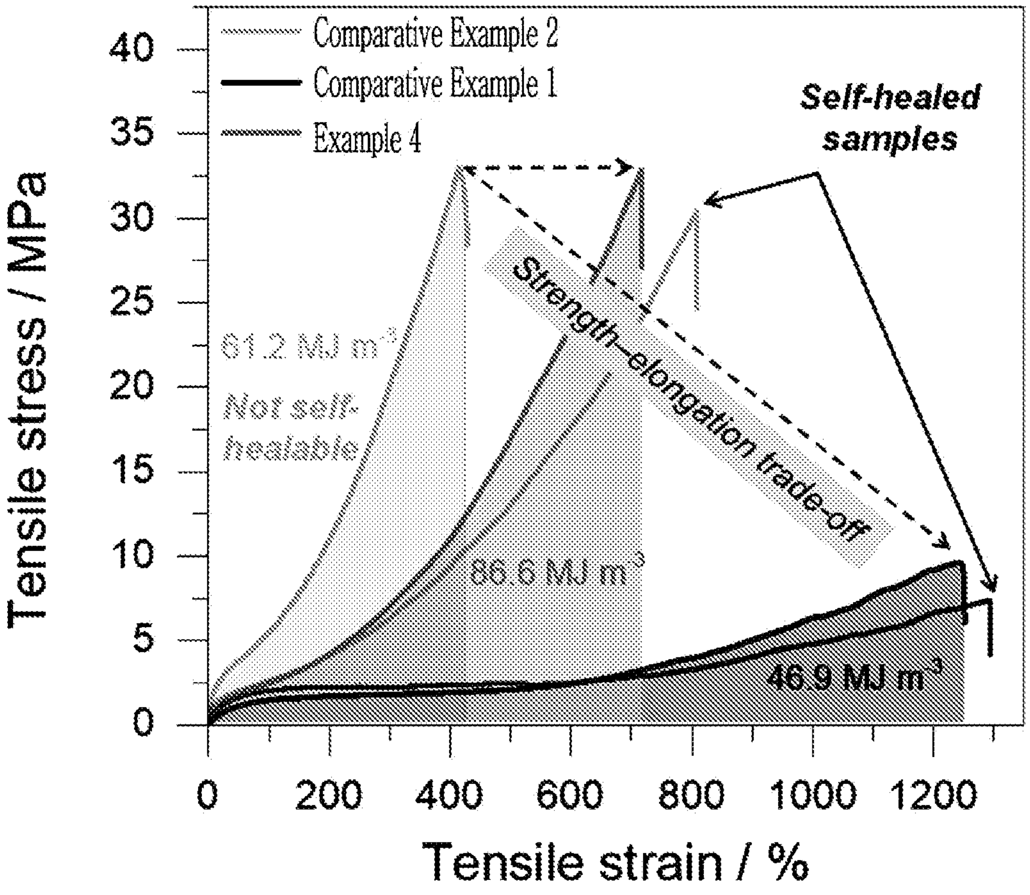
FIG. 5 is a graph showing the results of evaluating the mechanical properties of the films fabricated from the polyurethanes prepared in Example 4 and Comparative Examples 1 and 2.

Manufacturing processes of polyurethanes according to Example 4 and Comparative Examples 1 and 2, and the chemical structures of the polyurethanes prepared therefrom are shown in FIG. 4, and the results of evaluating mechanical properties of the prepared films are shown in FIG. 5.

The process of fabricating a film from the polyurethane prepared in the Example and Comparative Examples are as below.

Firstly, toluene is added to the polyurethane prepared in each example and comparative example to prepare a 20 wt % polyurethane solution, and each polyurethane solution is poured into a teflon mold of 40 mm (length)×40 mm (width)×10 mm (depth). Each polyurethane solution in the mold is dried for 6 hours at room temperature, and dried at 80° C. for 24 hours. Then, after additional drying in the vacuum oven of 60° C. for 24 hours, polyurethane film is obtained.

Mechanical properties of the obtained polyurethane films are tested by using a universal testing machine (UTM). In this case, each specimen of the polyurethane film has a rectangular shape of 25 mm (length)×5 mm (width), and a thickness of about 0.15 mm to 0.2 mm. Tensile strength test is performed at room temperature at a speed of 500%/minute.

(2) Example 5 and Comparative Example 3: Preparation of Polyurethanes

Same starting materials as Example 4, i.e., the same diol compound, the same vinyl-polyol, the same diisocyanate compound, and the same solvent, and a different chain extender, Dimethyl glyoxime (DMG) (Cas No.: 95-45-4), are used to prepare polyurethnaes. For preparing polyurethnae according to Example 5, the starting materials are mixed at a molar ratio of 0.95:0.05:1:2 of PTMEG:h-PBA:DMG:IPDI.

For preparing polyurethnae according to Comparative Example 3, the starting materials except for h-PBA are mixed at a molar ratio of 1:1:2 of PTMEG:DMG:IPDI.

Figure 6:
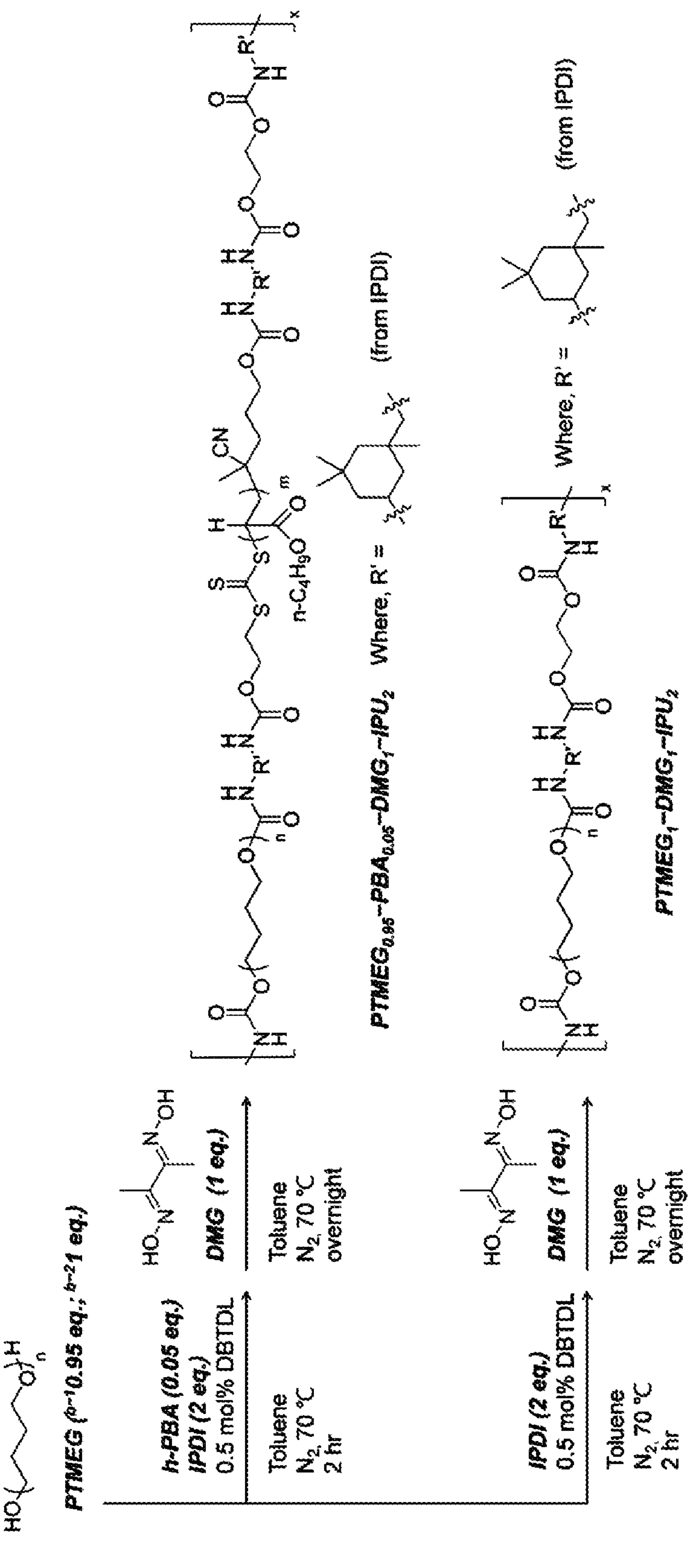
FIG. 6 shows the manufacturing process of polyurethanes according to Example 5 and Comparative Example 3, and reaction formulae showing the chemical structures of the polyurethane prepared therefrom.
Figure 7:
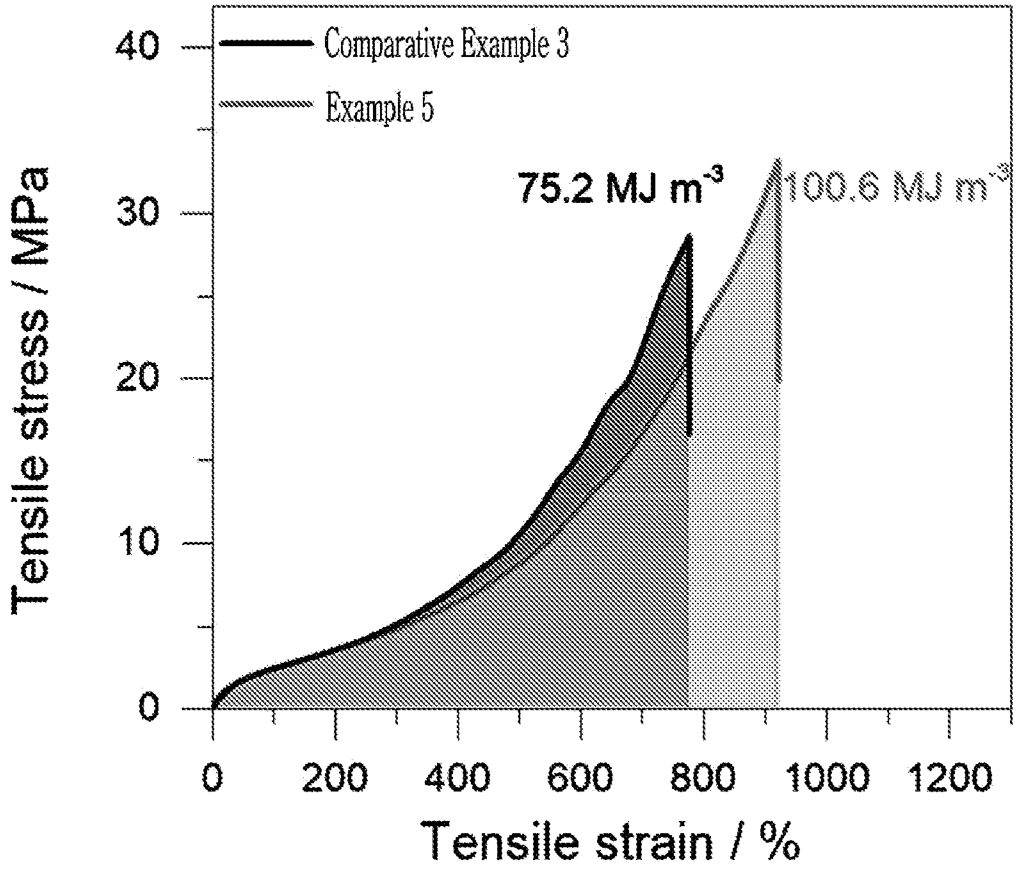
FIG. 7 is a graph showing the results of evaluating the mechanical properties of the films fabricated from the polyurethanes prepared in Example 5 and Comparative Example 3.

Manufacturing processes of polyurethanes according to Example 5 and Comparative Example 3, and the chemical structures of the polyurethanes prepared therefrom are shown in FIG. 6. Further, each polyurethane film is fabricated from the polyurethanes prepared from Example 5 and Comparative Example 3 by using the same method as described for Example 4 and Comparative Examples 1 and 2. The results of evaluating mechanical properties of the prepared films are shown in FIG. 7.

(3) Examples 6 and 7 and Comparative Example 4: Preparation of Polyurethanes

A vinyl-based polyol (h-PBA/BZP) (number average molecular weight about 3,500 g/mol) prepared by reacting a mixture of n-butyl acrylate and [4-(3-hydroxypropoxy)phenyl]phenylmethanone (BZP)(Cas No.: 1351758-79-6) at a molar ratio of 23:2 with hydroxyl-CTA, poly tetramethylene ether glycol (PTMEG)(Cas No.: 25190-06-1; number average molecular weight of about 1,000 g/mol), and isophorone diisocyanate (IPDI)(Cas No.: 4098-71-9) as a diisocyanate compound are used as starting materials, and toluene is used as a solvent. Ethylene glycol (EG)(Cas No.: 107-21-1) is used as a chain extender. Polymerization reaction is performed by mixing PTMEG, h-PBA/BZP, EG, and IPDI at a molar ratio of 0.95:0.05:2:3 of PTMEG:h-PBA/BZP:EG:IPDI to prepare a polyurethane (Example 6). After the polymerization reaction, a crosslinked polyurethane (Example 7) is prepared by irradiating linght of 345 nm to the prepared polyurethane according to Example 6 for 20 minutes by using a UV hand lamp of 100 $mW/cm^2$.

As Comparative Example 4, polymerization reaction is performed by mixing PTMEG, EG, and IPDI, without using h-PBA/BZP, at a molar ratio of 1:2:3 of PTMEG:EG:IPDI PTMEG (Comparative Example 4).

Figure 8:
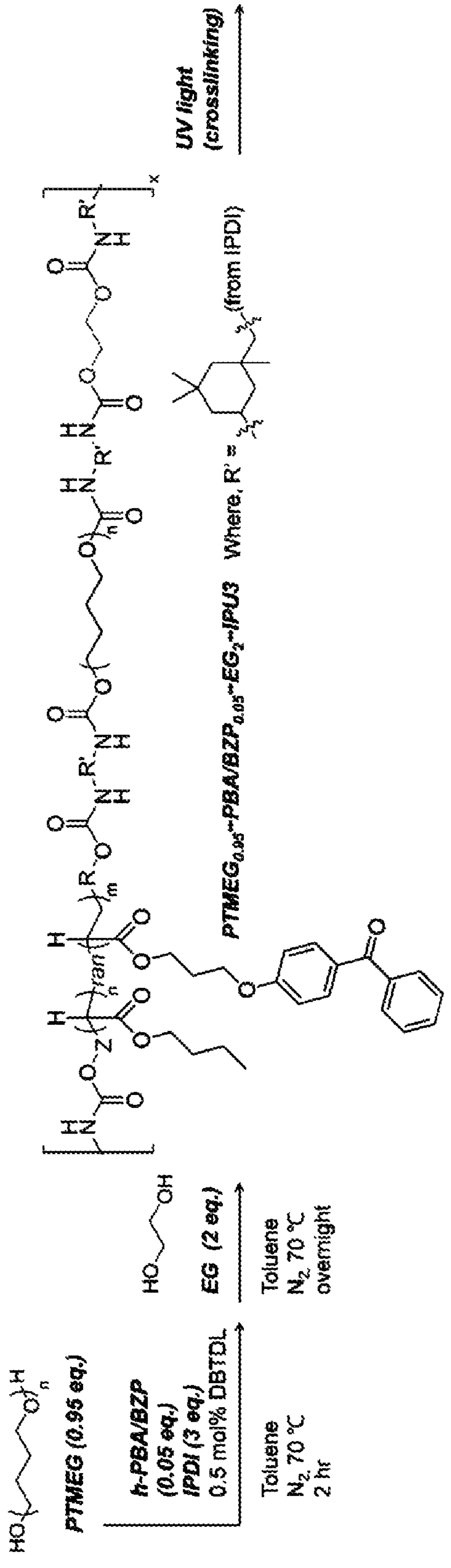
FIG. 8 shows the manufacturing process of polyurethane according to Example 6, and a reaction formula showing the chemical structure of the polyurethane prepared therefrom.
Figure 9:
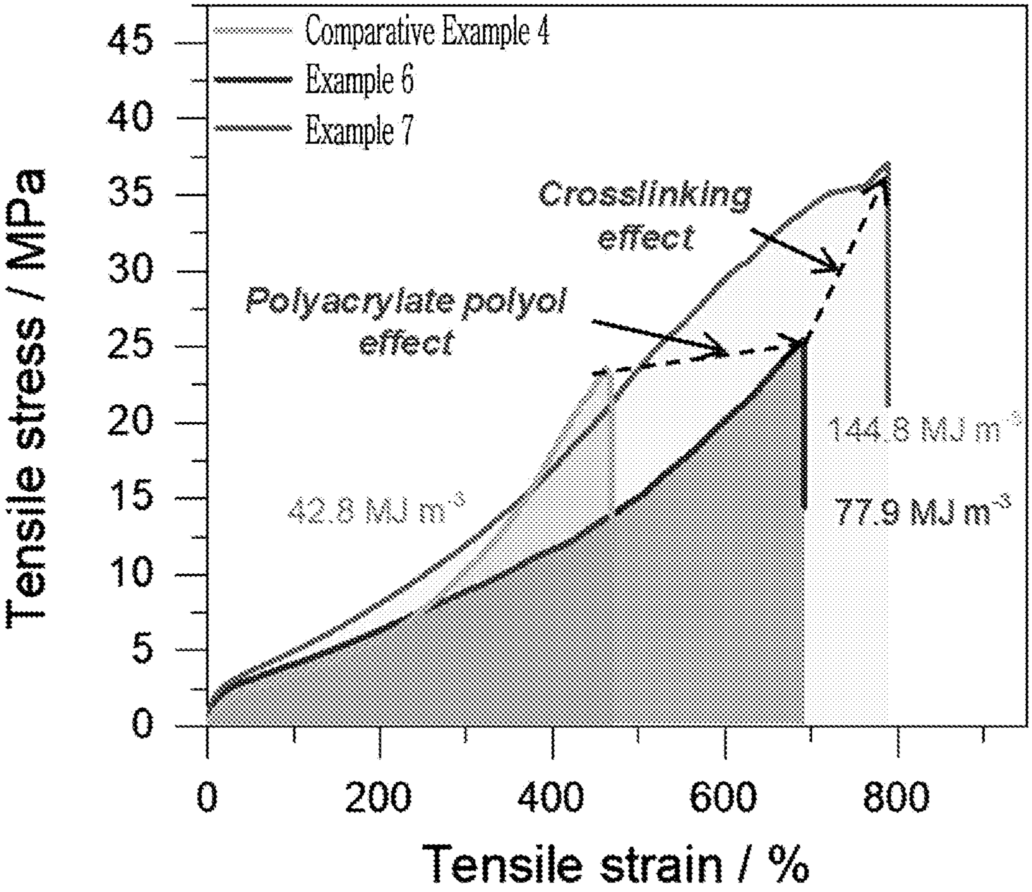
FIG. 9 is a graph showing the results of evaluating the mechanical properties of the films fabricated from the polyurethanes prepared in Examples 6 and 7 and Comparative Example 4.

Manufacturing processe of polyurethane according to Example 6, and the chemical structure of the polyurethane prepared therefrom are shown in FIG. 8. Further, each polyurethane film is fabricated from the polyurethanes prepared from Examples 6 and 7 and Comparative Example 4 by using the same method as described for Example 4 and Comparative Examples 1 and 2. The results of evaluating mechanical properties of the prepared films are shown in FIG. 9.

Evaluation: Evaluation of Self-Healing Ability of Polyurethane

A scratch test was performed by using the polyurethane films prepared in Example 4 and Comparative Examples 1 and 2, and the healing process of the films was tracked by using an optical microscope. The results are shown in FIG. 10.

Figure 10:
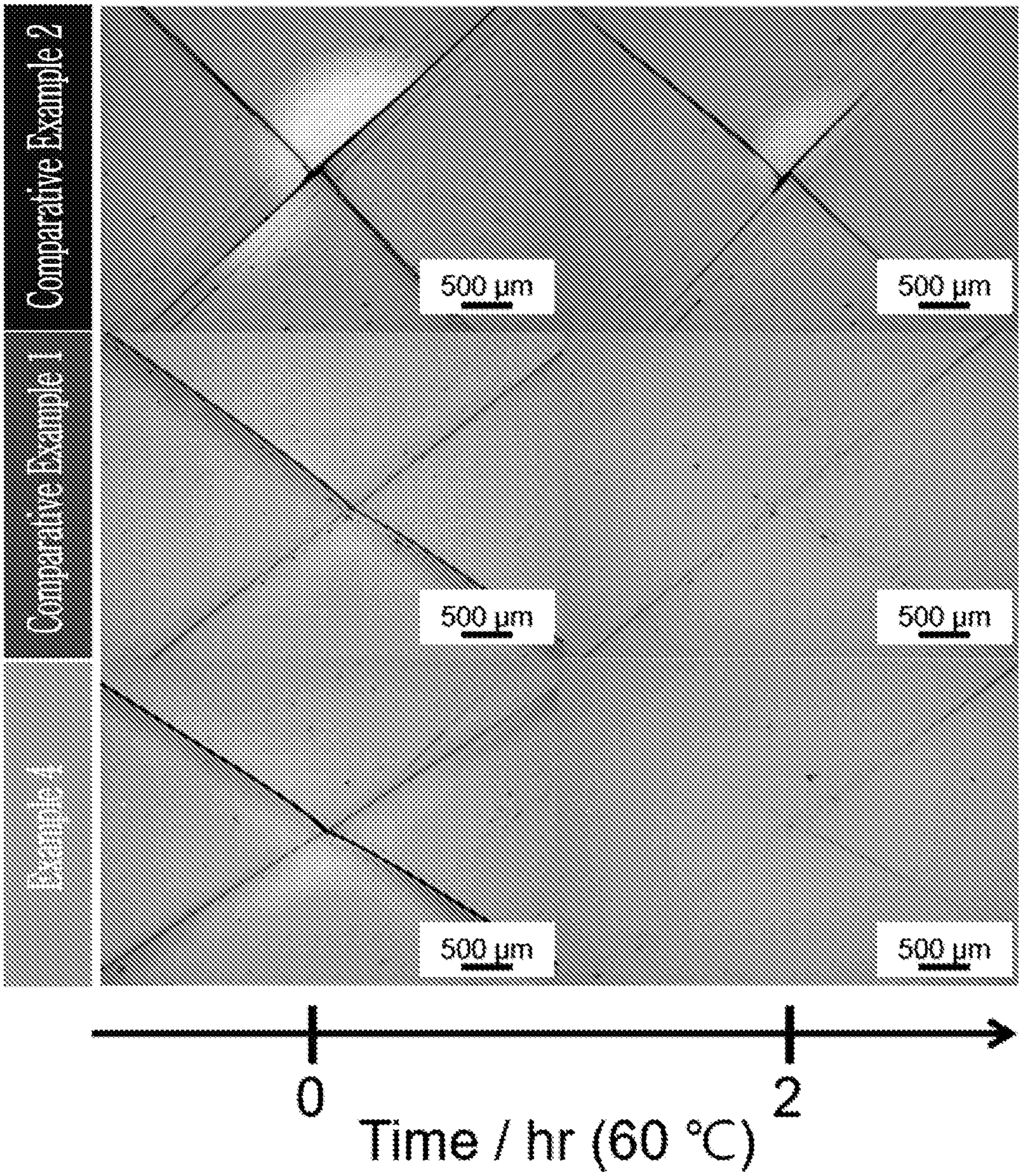
FIG. 10 shows scrached surfaces of the films according Example 4 and Comparative Examples 1 and 2 (left), and the surfaces of the films after being heated at 60° C. for 2 hours (right).

Specifically, scratches of about 40 μm thickness are formed on the surface of each polyurethane film by using a cutter (009 RD single edge razor blade) (left photos of FIG. 10). The scratched films were placed on a glass slide and heated to 60° C. on a heating plate and maintained at 60° C. After about 2 hours, images of the surfaces of the films were taken by an optical microscope and shown on the right of FIG. 10.

As can be seen from FIG. 10, the scratches on the surface of the polyurethane film according to Example 4 (left) were almost disappered (right) over a certain period of time after being heated at a low temperature. On the contrary, the scratches on the surface of the polyurethane film according to Comparative Example 2 (left) almost remained (right) after the same treatment as in Example 4. The scratches on the surface of the film according to Comparative Example 1 (left) were somewhat disappeared (right), but reamined more than the film of Example 4. From the results of FIG. 10, it is noted that the polyurethane film according to Example 4 has a self-healing effect.

From the examples and comparative examples described above, it is noted that the polyurethanes prepared from a polymer (vinyl-based polyol) having a narrow molecular weight distribution according to some example embodiments, compared to the polyurethanes according to the comparative examples, exhibit increased toughness by having increased or maintaining tensile stress as the stress increases. This phenomenon runs counter to the inverse relationship between tensile stress and tensile strength that occurs in conventional polyurethanes. Further, while conventional polyurethanes show a tendency of self-healing ability to decrease as toughness increases, the polyurethane film according to some example embodiments shows high ductility, and at the same time, rapid self-healing ability.

While the inventive concepts have been described in connection with what is presently considered to be practical example embodiments, it is to be understood that the inventive concepts are not limited to such example embodiments. On the contrary, the inventive concepts are intended to cover various modifications and equivalent arrangements included within the spirit and scope of the appended claims.

What is claimed is:

1. A polymer represented by Chemical Formula 3, the polymer having a number average molecular weight of about 242 g/mol to about 1,000,000 g/mol, and a polydispersity index of about 1 to about 1.05:

Chemical Formula 3

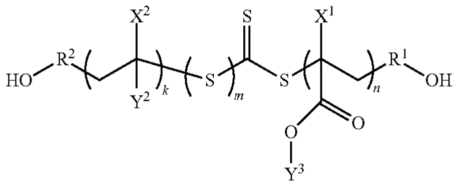

wherein, in Chemical Formula 3, $R^1$ and $R^2$ are each independently a substituted or unsubstituted C1 to C30 alkylene group, a substituted or unsubstituted C3 to C30 cycloalkylene group, a substituted or unsubstituted C6 to C30 arylene group, or a combination thereof, $X^1$ and $X^2$ are, each independently, hydrogen, deuterium, or a substituted or unsubstituted C1 to C30 alkyl group, $Y^2$ and $Y^3$ are, each independently, hydrogen, deuterium, substituted or unsubstituted C1 to C30 alkyl group, a substituted or unsubstituted C3 to C30 cycloalkyl group, a substituted or unsubstituted C6 to C30 aryl group, or a combination thereof, m is an integer of 1, k is an integer of 0, and n is an integer of greater than or equal to 1, provided that if n is an integer of 2 or more, then $X^1$ and $Y^3$ in two or more structural units denoted by n are the same as or different from each other.

2. The polymer of claim 1, wherein in Chemical Formula 3, $R^1$ and $R^2$ are each independently a substituted or unsubstituted C1 to C20 alkylene group, a substituted or unsubstituted C3 to C20 cycloalkylene group, a substituted or unsubstituted C6 to C20 arylene group, or a combination thereof, $X^1$ and $X^2$ are each independently hydrogen, deuterium, or a substituted or unsubstituted C1 to C20 alkyl group, and $Y^2$ and $Y^3$ are each independently hydrogen, deuterium, a substituted or unsubstituted C1 to C20 alkyl group, a substituted or unsubstituted C3 to C10 cycloalkyl group, a substituted or unsubstituted C6 to C20 aryl group, or a combination thereof.

3. The polymer of claim 1, wherein in Chemical Formula 3, $R^1$ and $R^2$ are each independently a substituted or unsubstituted C1 to C15 alkylene group, a substituted or unsubstituted C3 to C10 cycloalkylene group, a substituted or unsubstituted C6 to C10 arylene group, or a combination thereof, $X^1$ and $X^2$ are each independently hydrogen, or a substituted or unsubstituted C1 to C5 alkyl group, and $Y^2$ and $Y^3$ are each independently hydrogen, a substituted or unsubstituted C1 to C5 alkyl group, a substituted or unsubstituted C3 to C6 cycloalkyl group, a substituted or unsubstituted C6 to C10 aryl group, or a combination thereof.

4. The polymer of claim 1, wherein in Chemical Formula 3, $R^1$ and $R^2$ are each independently, a substituted or unsubstituted C1 to C10 alkylene group, $X^1$ and $X^2$ are each independently, hydrogen, or a C1 to C4 alkyl group, $Y^2$ and $Y^3$ are each independently, hydrogen, deuterium, a substituted or unsubstituted C1 to C20 alkyl group, a substituted or unsubstituted C3 to C10 cycloalkyl group, a substituted or unsubstituted C6 to C20 aryl group, or a combination thereof.

5. The polymer of claim 1, wherein the polymer represented by Chemical Formula 3 comprises at least one of the polymers represented by Chemical Formula 3-1 to Chemical Formula 3-5:

Chemical Formula 3-1

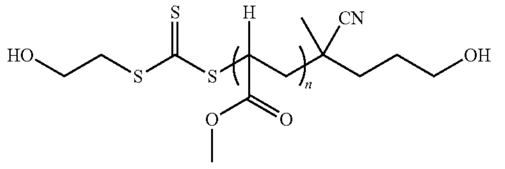

Chemical Formula 3-2

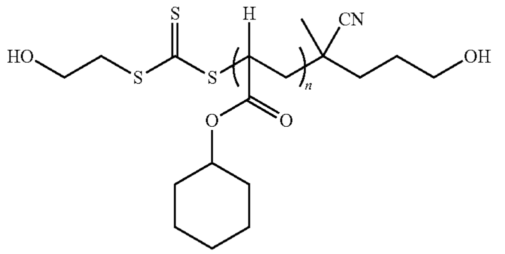

Chemical Formula 3-3

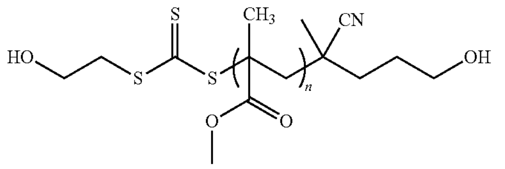

Chemical Formula 3-4

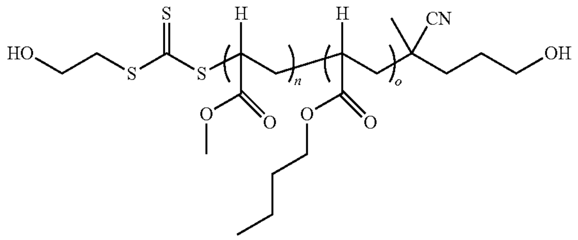

Chemical Formula 3-5

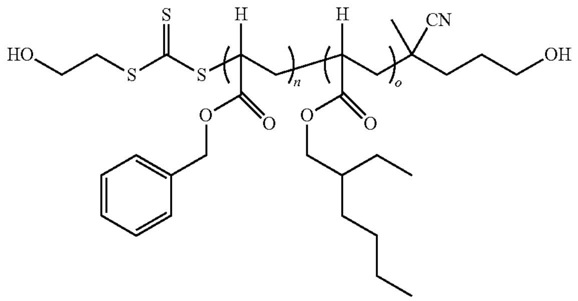

wherein in Chemical Formula 3-1 to Formula 3-3, n is an integer of greater than or equal to 1, and wherein in Chemical Formula 3-4 and Chemical Formula 3-5, n and o are each independently an integer of greater than or equal to 0, provided that n+o is an integer of greater than or equal to 1.

6. A polyurethane prepared by reacting the polymer of claim 1 with a mixture including a diol compound represented by Chemical Formula 4 and a diisocyanate compound represented by Chemical Formula 5:

Chemical Formula 4

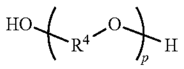

Chemical Formula 5

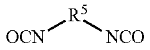

wherein in Chemical Formula 4 and Chemical Formula 5, $R^4$ and $R^5$ are, each independently, a substituted or unsubstituted C1 to C30 alkylene group, a substituted or unsubstituted C1 to C30 heteroalkylene group, a substituted or unsubstituted C3 to C30 cycloalkylene group, a substituted or unsubstituted C2 to C30 heterocycloalkylene group, a substituted or unsubstituted C2 to C30 alkenylene group, a substituted or unsubstituted C2 to C30 heteroalkenylene group, a substituted or unsubstituted C2 to C30 cycloalkenylene group, a substituted or unsubstituted C2 to C30 heterocycloalkenylene group, a substituted or unsubstituted C2 to C30 alkynylene group, a substituted or unsubstituted C6 to C30 arylene group, a substituted or unsubstituted C2 to C30 heteroarylene group, or a combination thereof, and p in Chemical Formula 4 is an integer of greater than or equal to 1.

7. The polyurethane of claim 6, wherein the diol compound represented by Formula 4 comprises at least one of the compounds represented by Chemical Formula 4-1 to Chemical Formula 4-4:

Chemical Formula 4-1

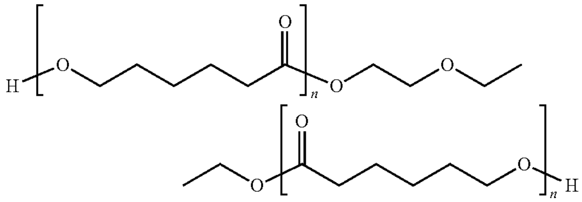

Chemical Formula 4-2

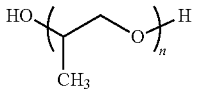

Chemical Formula 4-3

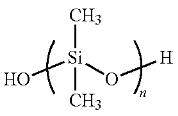

Chemical Formula 4-4

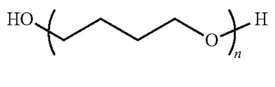

wherein in Chemical Formula 4-1, each n is an integer of greater than or equal to 0, and wherein in Chemical Formula 4-2 to Formula 4-4, each n is an integer of greater than or equal to 1.

8. The polyurethane of claim 6, wherein the diisocyanate compound represented by Chemical Formula 5 comprises at least one of the compounds represented by Chemical Formula 5-1 to Chemical Formula 5-7:

Chemical Formula 5-1

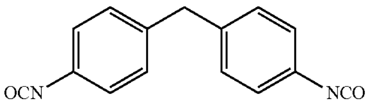

Chemical Formula 5-2

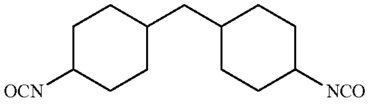

Chemical Formula 5-3

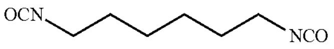

Chemical Formula 5-4

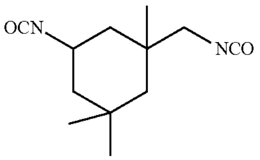

Chemical Formula 5-5

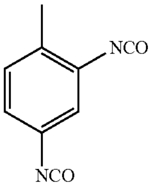

Chemical Formula 5-6

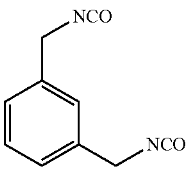

Chemical Formula 5-7

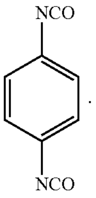

9. The polyurethane of claim 6, wherein the mixture further comprises one or more of the compounds represented by Chemical Formula 6 and Chemical Formula 7:

Chemical Formula 6

$HO—R^6—OH$

Chemical Formula 7

$H_2NR^7—NH_2$ wherein in Chemical Formula 6 and Chemical Formula 7, $R^6$ and $R^7$ are, each independently, a substituted or unsubstituted C1 to C30 alkylene group, a substituted or unsubstituted C3 to C30 cycloalkylene group, a substituted or unsubstituted C1 to C30 heteroalkylene group, a substituted or unsubstituted C2 to C30 alkenylene group, a substituted or unsubstituted C3 to C30 cycloalkenylene group, a substituted or unsubstituted C2 to C30 heteroalkeynylene group, a substituted or unsubstituted C2 to C30 alkynylene group, a substituted or unsubstituted C3 to C30 cycloalkynylene group, a substituted or unsubstituted C2 to C30 heteroalkynylene group, a substituted or unsubstituted C6 to C30 arylene group, a substituted or unsubstituted C2 to C30 heteroarylene group, or a combination thereof.

10. The polyurethane of claim 9, wherein the compound represented by Chemical Formula 6 comprises at least one of the compounds represented by Chemical Formula 8 to Chemical Formula 10:

Chemical Formula 8

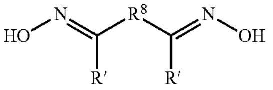

Chemical Formula 9

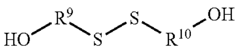

Chemical Formula 10

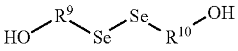

wherein in Chemical Formulas 8 to 10, $R^8$ to $R^{10}$ are, each independently, a substituted or unsubstituted C1 to C30 alkylene group, a substituted or unsubstituted C3 to C30 cycloalkylene group, a substituted or unsubstituted C1 to C30 heteroalkylene group, a substituted or unsubstituted C2 to C30 alkenylene group, a substituted or unsubstituted C3 to C30 cycloalkenylene group, a substituted or unsubstituted C2 to C30 heteroalkeynylene group, a substituted or unsubstituted C2 to C30 alkynylene group, a substituted or unsubstituted C3 to C30 cycloalkynylene group, a substituted or unsubstituted C2 to C30 heteroalkynylene group, a substituted or unsubstituted C6 to C30 arylene group, a substituted or unsubstituted C2 to C30 heteroarylene group, or a combination thereof, and wherein in Chemical Formula 8, R' is hydrogen, deuterium, a substituted or unsubstituted C1 to C30 alkyl group, a substituted or unsubstituted C3 to C30 cycloalkyl group, a substituted or unsubstituted C1 to C30 heteroalkyl group, a substituted or unsubstituted C2 to C30 alkenyl group, a substituted or unsubstituted C3 to C30 cycloalkenyl group, a substituted or unsubstituted C2 to C30 heteroalkenyl group, a substituted or unsubstituted C2 to C30 alkynyl group, a substituted or unsubstituted C3 to C30 cycloalkynyl group, a substituted or unsubstituted C2 to C30 heteroalkynyl group, a substituted or unsubstituted C6 to C30 aryl group, a substituted or unsubstituted C2 to C30 heteroaryl group, or a combination thereof.

11. The polyurethane of claim 9, wherein the compound represented by Chemical Formula 6 comprises at least one of the compounds represented in Group 2:

Group 2

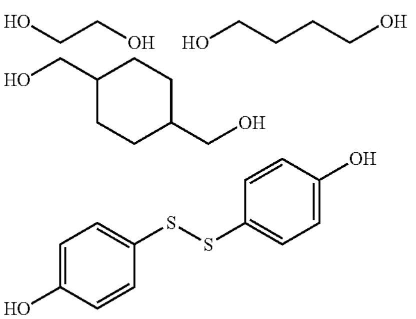

-continued

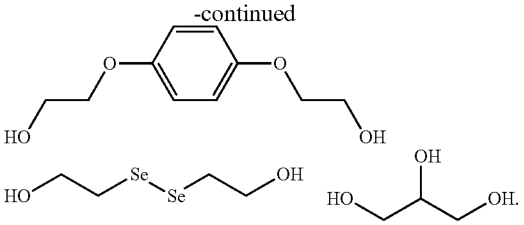

12. The polyurethane of claim 6, wherein the polyurethane is a linear type having two terminals, wherein at least one of the two terminals is substituted with a glycidyl group.

13. A method of preparing a polymer represented by Chemical Formula 3, the method comprising stirring a mixture of a compound represented by Chemical Formula 11 and a compound represented by Chemical Formula 12 while irradiating light in visible light region under a nitrogen atmosphere, wherein the polymer represented by Chemical Formula 3 has a number average molecular weight of about 242 g/mol to about 1,000,000 g/mol, and a polydispersity index of about 1 to about 1.05:

Chemical Formula 11

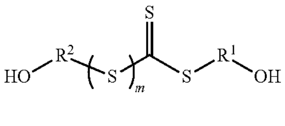

wherein in Chemical Formula 11, $R^1$ and $R^2$ are each independently, a substituted or unsubstituted C1 to C30 alkylene group, a substituted or unsubstituted C3 to C30 cycloalkylene group, a substituted or unsubstituted C6 to C30 arylene group, or a combination thereof, and m is an integer of 1;

Chemical Formula 12

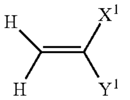

wherein in Chemical Formula 12, $X^1$ is hydrogen, deuterium, or a substituted or unsubstituted C1 to C30 alkyl group, and $Y^1$ is $R^aC(=O)OR^d$, wherein, $R^a$ is, single bond, and $R^d$ is hydrogen, deuterium, a substituted or unsubstituted C1 to C30 alkyl group, a substituted or unsubstituted C3 to C30 cycloalkyl group, a substituted or unsubstituted C6 to C30 aryl group, or a combination of thereof; and Chemical Formula 3

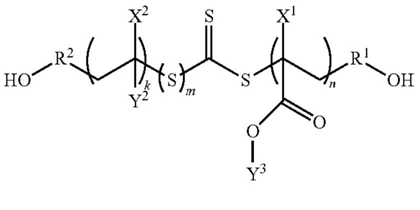

wherein in Chemical Formula 3, $R^1$, $R^2$, $X^1$, and m are the same as defined in Chemical Formula 11 and Chemical Formula 12, $X^2$ is hydrogen, deuterium, or a substituted or unsubstituted C1 to C30 alkyl group, $Y^2$ and $Y^3$ are, each independently, hydrogen, deuterium, a substituted or unsubstituted C1 to C30 alkyl group, a substituted or unsubstituted C3 to C30 cycloalkyl group, a substituted or unsubstituted C6 to C30 aryl group, or a combination of thereof, m is an integer of 1, k is an integer of 0, n is an integer of greater than or equal to 1, provided that if n is an integer of 2 or more, then $X^1$ and $Y^3$ in two or more structural units denoted by n are the same as or different from each other.

14. The method of claim 13, wherein the method does not use a catalyst.

* * * * *